United States Patent
Dwarakanath et al.

(10) Patent No.: US 9,185,998 B1
(45) Date of Patent: Nov. 17, 2015

(54) INVENTORY SYSTEM WITH CLIMATE-CONTROLLED INVENTORY

(71) Applicant: Amazon Technologies, Inc., Reno, NV (US)

(72) Inventors: Samvid Hariram Dwarakanath, Seattle, WA (US); Sean William Blakey, Seattle, WA (US); Bryant Richard Casteel, Seattle, WA (US); Bruce John Cooper, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/635,645

(22) Filed: Mar. 2, 2015

Related U.S. Application Data

(63) Continuation of application No. 13/713,835, filed on Dec. 13, 2012, now Pat. No. 9,008,827.

(51) Int. Cl.
| | | |
|---|---|---|
| *G06F 7/00* | (2006.01) | |
| *A47F 3/04* | (2006.01) | |
| *G05D 1/02* | (2006.01) | |
| *B66F 9/06* | (2006.01) | |
| *F25B 27/00* | (2006.01) | |
| *F25D 11/00* | (2006.01) | |

(52) U.S. Cl.
CPC ............... *A47F 3/0482* (2013.01); *B66F 9/063* (2013.01); *F25B 27/00* (2013.01); *F25D 11/003* (2013.01); *G05D 1/0276* (2013.01)

(58) Field of Classification Search
None
See application file for complete search history.

(56) References Cited

U.S. PATENT DOCUMENTS

| | | | |
|---|---|---|---|
| 6,748,292 B2 | 6/2004 | Mountz | |
| 6,895,301 B2 | 5/2005 | Mountz | |
| 6,950,722 B2 | 9/2005 | Mountz | |
| 7,402,018 B2 | 7/2008 | Mountz et al. | |
| 7,826,919 B2 | 11/2010 | D'Andrea et al. | |
| 7,850,413 B2 | 12/2010 | Fontana | |
| 7,873,496 B2 | 1/2011 | Gajic | |
| 7,894,932 B2 | 2/2011 | Mountz et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,068,978 B2 | 11/2011 | D'Andrea et al. | |
| 8,170,711 B2 | 5/2012 | D'Andrea et al. | |
| 8,180,493 B1 | 5/2012 | Lasko | |

(Continued)

OTHER PUBLICATIONS

Dwarakanath et al., U.S. Appl. No. 13/713,898, filed Dec. 13, 2012; Application Entitled: *Inventory System with Climate-Controlled Inventory*; (74 pgs), Dec. 13, 2012.

(Continued)

*Primary Examiner* — Yolanda Cumbess
(74) *Attorney, Agent, or Firm* — Baker Botts L.L.P.

(57) ABSTRACT

A system includes a climate-controlled inventory holder, a mobile drive unit, and a management module. The climate-controlled inventory holder is configured to control a climate of one or more inventory items stored by the inventory holder. The mobile drive unit is operable to transport the climate-controlled inventory holder from a first location to a second location based at least in part upon one or more instructions received from a management module. The management module is operable to receive an order for an inventory item, determine that the inventory holder stores the inventory item, and instruct the mobile drive unit to transport the climate-controlled inventory holder from the first location to the second location.

20 Claims, 7 Drawing Sheets

(56) References Cited

U.S. PATENT DOCUMENTS

| | | | |
|---|---|---|---|
| 8,220,710 | B2 | 7/2012 | Hoffman et al. |
| 8,239,291 | B2 | 8/2012 | Hoffman et al. |
| 8,280,546 | B2 | 10/2012 | D'Andrea et al. |
| 8,280,547 | B2 | 10/2012 | D'Andrea et al. |
| 8,311,902 | B2 | 11/2012 | Mountz et al. |
| 8,412,400 | B2 | 4/2013 | D'Andrea et al. |
| 8,444,369 | B2 | 5/2013 | Watt et al. |
| 8,483,869 | B2 | 7/2013 | Wurman et al. |
| 8,538,692 | B2 | 9/2013 | Wurman et al. |
| 8,606,392 | B2 | 12/2013 | Wurman et al. |
| 2006/0020366 | A1* | 1/2006 | Bloom .............. 700/226 |
| 2009/0299534 | A1* | 12/2009 | Ludwig .............. 700/278 |
| 2011/0153063 | A1 | 6/2011 | Wurman et al. |
| 2011/0202170 | A1* | 8/2011 | Dawes et al. .............. 700/215 |
| 2012/0143427 | A1 | 6/2012 | Hoffman et al. |
| 2012/0282070 | A1 | 11/2012 | D'Andrea et al. |
| 2013/0054005 | A1* | 2/2013 | Stevens et al. .............. 700/216 |
| 2013/0103552 | A1 | 4/2013 | Hoffman et al. |
| 2013/0173049 | A1 | 7/2013 | Brunner et al. |
| 2013/0302132 | A1 | 11/2013 | D'Andrea |

OTHER PUBLICATIONS

USPTO Non-Final Office Action; U.S. Appl. No. 13/713,898, Inventor: Dwarakanath et al., (9 pgs.), Jun. 5, 2014.

*Response to Non-Final Office Action*; Dwarakanath et al., U.S. Appl. No. 13/713,898 (14 pgs), Sep. 3, 2014.

USPTO Notice of Allowance and Fee(s) Due; U.S. Appl. No. 13/713,898, Inventor: Dwarakanath et al., 6 pgs, Oct. 9, 2014.

* cited by examiner

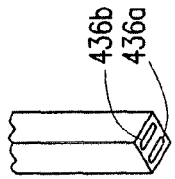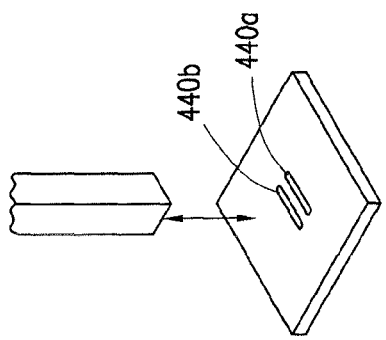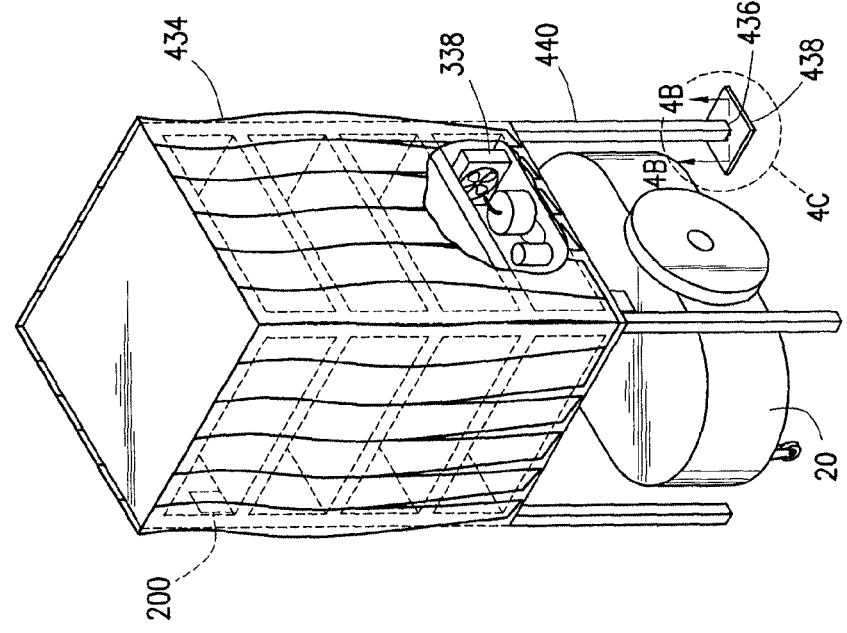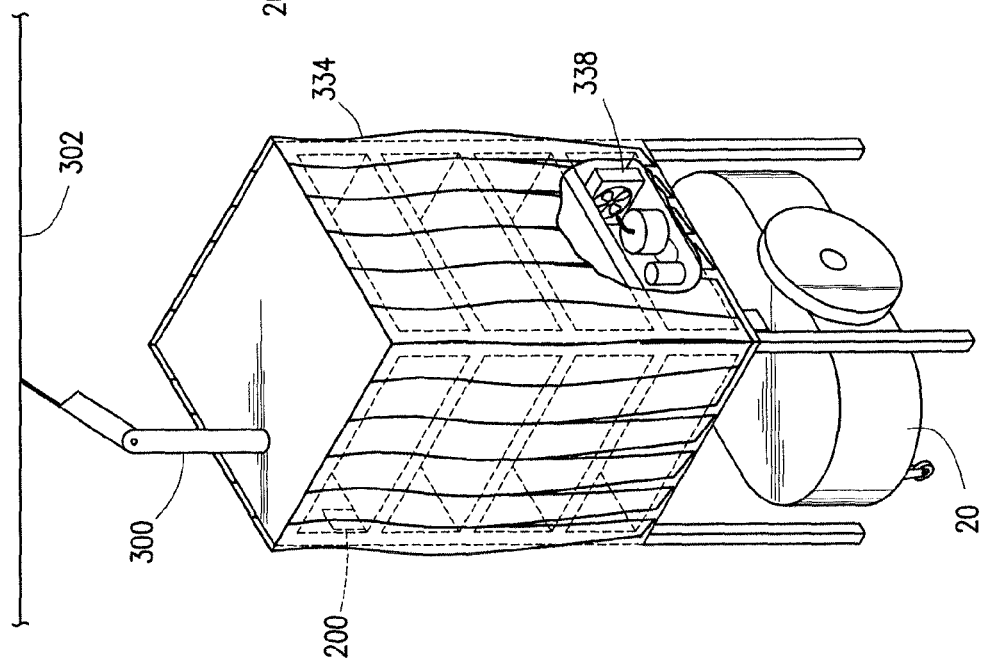

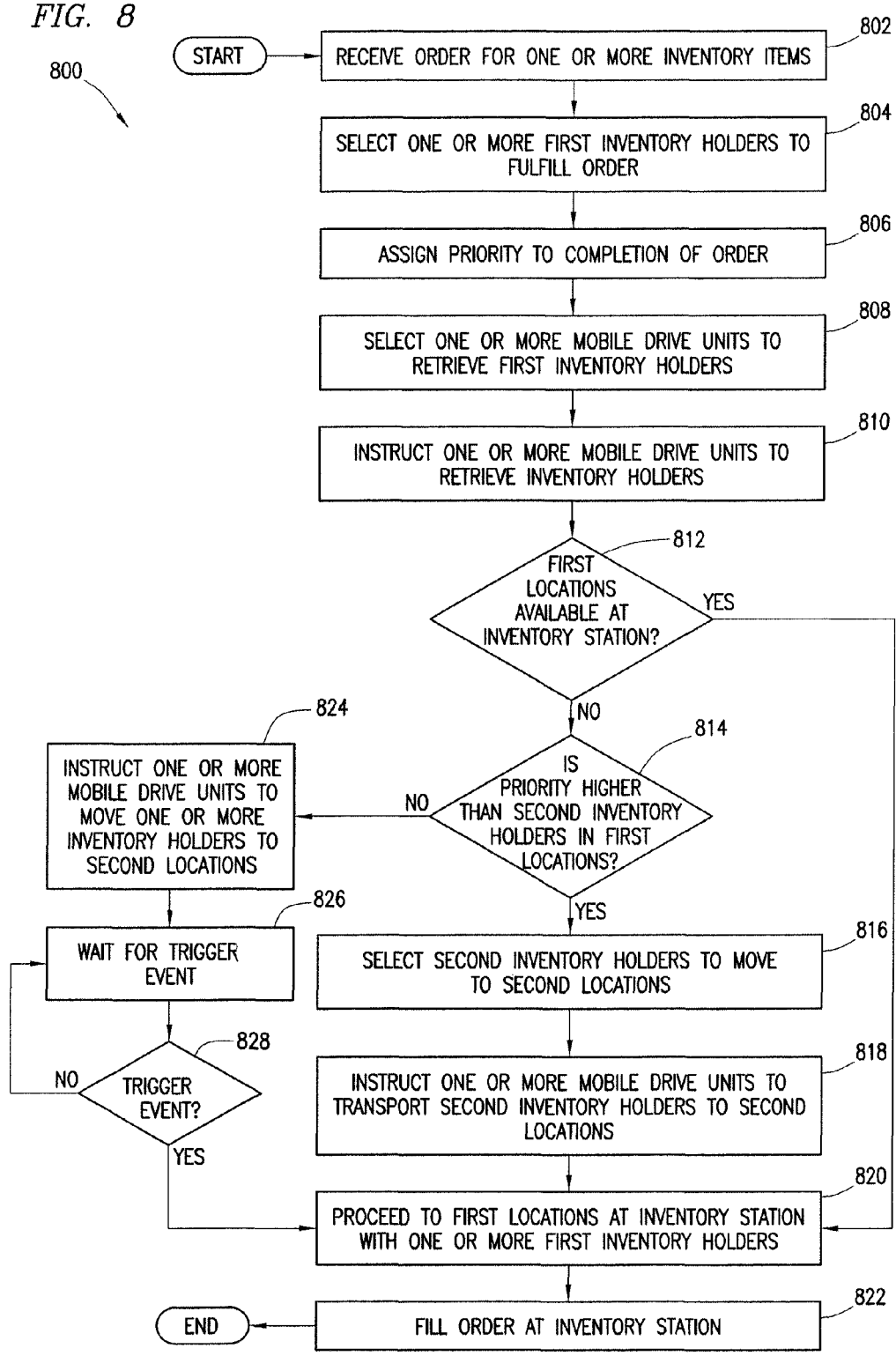

INVENTORY SYSTEM WITH CLIMATE-CONTROLLED INVENTORY

RELATED APPLICATION

This application is a continuation of U.S. application Ser. No. 13/713,835 filed Dec. 13, 2012, entitled "Inventory System with Climate-Controlled Inventory."

BACKGROUND OF THE INVENTION

Modern inventory systems, such as those in distribution warehouses, e-commerce warehouses, and custom-order manufacturing facilities, face significant challenges in responding to requests for inventory items. In particular, inventory systems face challenges in making efficient use of time, space, resources in the face of growing demand and tighter shipping schedules. Those challenges are exacerbated in inventory systems that store temperature-controlled inventory items, such as online grocers that store refrigerated and frozen goods. As a result, the ability to fulfill orders in a timely and efficient matter where those orders include requests for ambient inventory items and requests for climate-controlled inventory items can be crucial to the success of such inventory systems.

BRIEF DESCRIPTION OF THE DRAWINGS

For a more complete understanding of the present invention and its advantages, reference is now made to the following description, taken in conjunction with the accompanying drawings, in which:

FIG. 3 is a perspective drawing illustrating an example embodiment of a climate-controlled inventory holder;

FIGS. 4A, 4B, and 4C are perspective drawings illustrating an example embodiment of a climate-controlled inventory holder;

FIG. 8 is a flowchart illustrating an example method for fulfilling an order for climate-controlled inventory items.

DESCRIPTION OF EXAMPLE EMBODIMENTS

Figure 1:
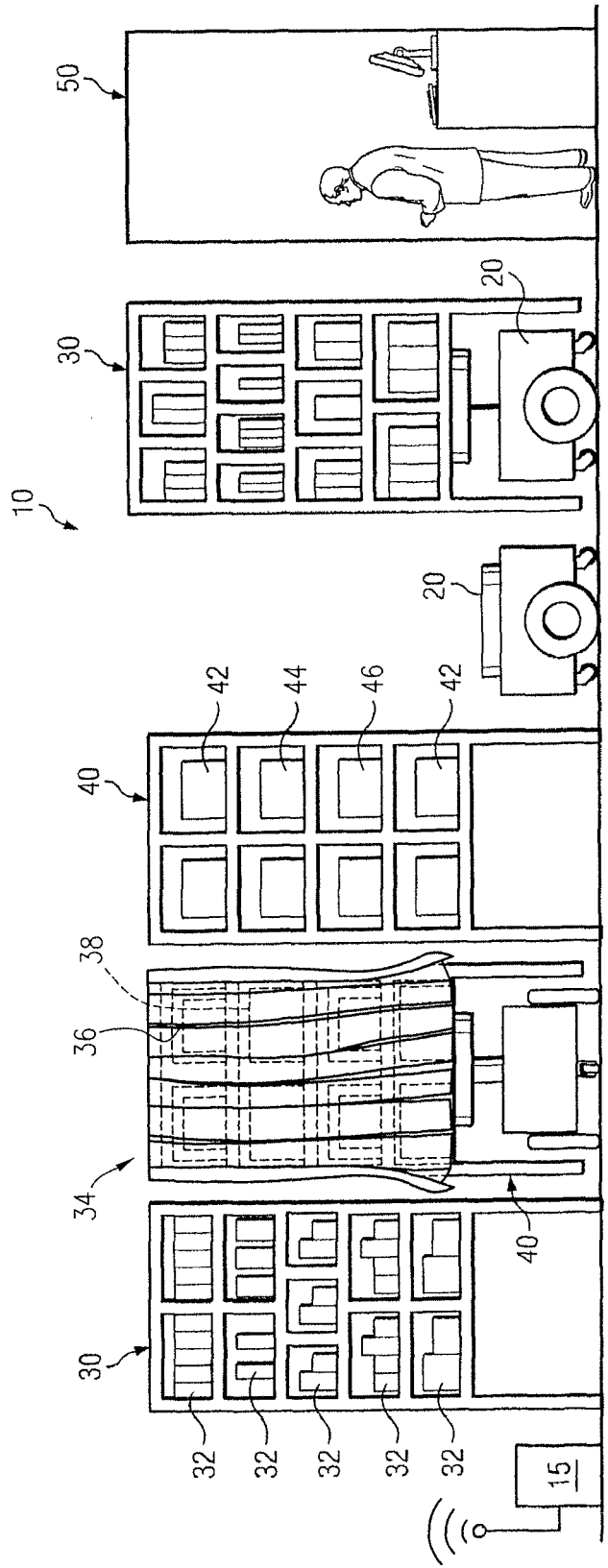
FIG. 1 is an illustration of an example embodiment of an inventory system with climate-controlled inventory.

Manufacturers, retailers, wholesalers, distribution centers, and other distributors of product or goods (which may collectively be referred to as distributors) typically maintain an inventory of various items that may be ordered by and shipped to clients or customers. This inventory may be maintained and processed at a materials handling facility or facilities such as distribution centers, cross-docking facilities, and order fulfillment facilities. In one example, an online grocer may provide a website from which a customer may order various groceries and/or configure a periodic delivery service. When an order is placed or delivery service setup, those inventory items may be ordered and retrieved from a storage are of a warehouse or distribution center at the appropriate time for delivery to the customer. In order to facilitate storage, management, and retrieval of groceries on customer orders, online grocers may utilize a warehouse of racks that store groceries in various bins. When an order for a specific product needs to be filled by the grocer, a worker typically retrieves the product from the bin where the inventory item is stored. Such grocers may also store refrigerated items, such as milk, eggs, and produce, and frozen groceries, such as frozen dinners and frozen vegetables. Those types of groceries are typically stored in walk-in coolers and freezers. Workers retrieving those groceries may be required to utilize special safety procedures for entering the coolers or freezers, such as wearing special clothing and/or using a "buddy system" where one worker remains outside the freezer while another retrieves the desired item. Accordingly, retrieval of refrigerated and frozen goods may be more time-consuming, costly, and complicated than retrieving other non-refrigerated goods.

Inventory systems of the present disclosure may utilize one or more mobile drive units to automatically retrieve inventory holders from warehouse storage, including from temperature-controlled zones such as coolers and freezers. The inventory holders may be entire racks of shelves, with each shelf having bins for various inventory items. In addition, the inventory systems of the present disclosure may include systems for providing climate control to individual inventory holders, which may render the use of walk-in freezers and coolers optional. For example, some inventory holders may be mobile refrigerators and/or be cooled by connecting automatically to vents of a centralized heating, ventilation, and air conditioning (HVAC) system installed in the warehouse. Mobile drive units may be self-powered robotic devices configured to move freely about the warehouse. Non-refrigerated and climate-controlled inventory holders may be transported by mobile drive units to a station for performing inventory operations. The station may include a human operator and/or automated equipment to remove desired inventory items from the inventory holders and complete orders. The ability for mobile drive units to transport inventory items to a station for performing inventory operations rather than or in addition to workers manually retrieving inventory items from stationary racks may vastly increase efficiency and productivity of the inventory system, particularly for cool and frozen goods. For example, the capability for mobile drive units to automatically enter and retrieve racks from temperature-controlled zones of the warehouse may obviate the time-consuming and complicated process of having workers manually enter those zones to retrieve inventory. By utilizing mobile drive units and providing the ability to automatically manage and retrieve refrigerated and frozen inventory items, an inventory system may be capable of fulfilling more orders per hour than previous solutions. Mobile drive units may move about the warehouse and/or retrieve either types of inventory holders in response to commands and/or instructions received from an automated guidance system. For example, a management module may control administration and coordination of certain elements and/or tasks within the warehouse. The management module may receive orders for inventory items in the warehouse and coordinate task assignments for fulfilling the orders, including providing instructions to mobile drive units to transport racks with requested inventory items to an inventory station for completion of an order. The management module may also provide guidance at the inventory station for how the order is to be assembled.

To use a simple illustration, in a distribution warehouse for an online grocer, the management module may receive an order for several cans of soup, fresh lettuce, and a frozen dinner. The management module may determine the locations of these items within the racks of storage in the distribution warehouse. The items may, for instance, be on the shelves of three separate racks. The soup cans may be located on a rack in a room-temperature and/or ambient climate zone of the warehouse. The fresh lettuce may be located on a rack in a walk-in cooler and/or in an individually climate-controlled inventory holder in the room-temperature and/or ambient climate zone. The frozen dinner may be located in a walk-in cooler and/or in an individually climate-controlled inventory holder in the room-temperature and/or ambient climate zone. The management module may issue tasks for three different mobile drive units to retrieve each rack respectively holding the soup, lettuce, and frozen dinner, and for the mobile drive units to transport the racks holding those items to an inventory station where the order for the three items may be packed into one or more boxes for shipment. The management module may also coordinate the delivery of appropriate boxes for each item, which may be different depending on the temperature of the item. For example, non-refrigerated items may be shipped in non-insulated boxes, while refrigerated or frozen items may be shipped in insulated boxes or containers. In doing so, the management module may coordinate the various tasks such that all of the orders received by the management module are fulfilled in an efficient manner.

Technical advantages of certain embodiments of the present invention include the ability to provide an inventory system that can automatically retrieve both inventory items that are stored at ambient temperatures and inventory items that are stored at cool and/or frozen temperatures. For online grocers, by providing an inventory system that automatically coordinates the storage and retrieval of ambient temperature inventory and temperature-controlled inventory, the ability to provide fresh goods and produce in a timely and efficient manner can be vastly increased. The ability for mobile drive units to automatically retrieve racks of inventory from temperature-controlled zones of a warehouse may eliminate the need for workers to enter those zones to retrieve inventory, thereby increasing efficiency and alleviating the need for complicated safety procedures when entering those zones. Another technical advantage includes the ability to provide a climate-controlled inventory holder that can be transported by a mobile drive unit. The ability to use climate-controlled inventory holders may allow for inventory systems to store climate-controlled inventory holders and non-refrigerated inventory holders in the same temperature zone of a warehouse, without the need for separately controlled temperature zones for cool and/or frozen items such as walk-in coolers or freezers. Existing warehouses that include separated temperature zones, such as walk-in freezers and coolers, may be capable of deploying mobile drive units to automatically retrieve inventory stored in the freezers and coolers and/or may utilize a combination of inventory holders in walk-in coolers and freezers, and climate-controlled inventory holders in the room-temperature and/or ambient zone of the warehouse. New warehouses may deploy climate-controlled inventory holders and/or install walk-in coolers or freezers to store temperature-controlled inventory. Further technical advantages of certain embodiments of the present invention may include providing a flexible and scalable inventory storage solution that can be easily adapted to accommodate system growth and modification. Further technical advantages of certain embodiments of the present invention may include providing a flexible and scalable inventory storage solution that can be easily adapted to accommodate system growth and modification. Other technical advantages of the present invention will be readily apparent to one skilled in the art from the following figures, descriptions, and claims.

While specific advantages have been enumerated above, various embodiments may include all, some, or none of the enumerated advantages. Embodiments of the present invention and its advantages are best understood by referring to FIGS. 1 through 10, wherein like numerals refer to like and corresponding parts of the various drawings.

FIG. 1 is an illustration of an example embodiment of an inventory system 10 with climate-controlled inventory. Inventory system 10 includes a management module 15, one or more mobile drive units 20, one or more inventory holders 30, one or more climate-controlled inventory holders 34, one or more container holders 40, and one or more stations 50. Inventory holders 30 may store ambient inventory items 32 at an ambient and/or room-temperature. Climate-controlled inventory holders 34 may store cool inventory items 36 and/or frozen inventory items 38. Container holders 40 may store various containers 40, 44, and/or 46. Containers 40, 44, and/or 46 may respectively be designed and/or designated for storing ambient inventory items 32, cool inventory items 36, and frozen inventory items 38. In general, management module 15 manages the administration and coordination of the various elements of system 10 in order to fulfill orders received by system 10. For example, management module 15 may receive various orders that include requests for ambient inventory items 32, cool inventory items 36 and/or frozen inventory items 38. Management module 15 may then administer and coordinate various tasks calculated to assemble containers 42, 44, and 46 for inventory items 32, 36, and 38 according to the received orders. Management module 15 may taken into account temperature characteristics of inventory items 32, 36, and 38 in each inventory holder 30 and 34 when administering and coordinating the various tasks. For example, management module 15 may prioritize fulfillment of orders for cool inventory items 36 and/or frozen inventory items 38. In response to commands communicated by management module 15, mobile drive units 20 may transport inventory holders 30, inventory holders 34, and/or container holders 40 to various locations within inventory system 10, such as stations 50. At stations 50, inventory items 32, 36, 38 may be placed into containers 42, 44, 46 and/or otherwise prepared for shipment. Mobile drive units 20 may then transport container holders 40 to a shipping location or other destination within inventory system 10. A more detailed description of how inventory system 10 may be utilized to fulfill orders for ambient inventory items 32, cool inventory items 36, and frozen inventory items 38 will be explained in detail below with respect to FIGS. 2 through 8.

Management module 15 receives and/or generates requests and may initiate particular operations involving mobile drive units 20, inventory holders 30, inventory items 32, 36, 38, container holders 40, containers 42, 44, 46, stations 50, and/or other elements of inventory system 10. Management module 15 may select components of inventory system 10 to perform these operations and communicate commands, instructions, and/or other appropriate information to the selected components to facilitate completion of these operations. Management module 15 may receive orders for various inventory items 32, 36, 38 and coordinate and administer various appropriate tasks to fill the orders based on various temperature characteristics of those items. Management module 15 may receive orders from any appropriate system or component, and may alternatively or additionally generate tasks and assign tasks to various components of inventory system 10 using any appropriate techniques. In particular embodiments, management module 15 generates task assignments based, in part, on orders including requests for inventory items 32, 36, 38 that management module 15 receives from other components of inventory system 10 and/or from external components in communication with management module 15. Based on the orders, management module 15 may identify particular operations to be completed involving inventory items stored or to be stored within inventory system 10 and may represent communication of any suitable form. For example, in particular embodiments, an order may specify particular inventory items 32, 36, 38 that have been purchased by a customer and that are to be retrieved from inventory system 10 for shipment to the customer. For example, those items may include fresh goods and produce ordered through a website of an online grocer. Although the description below discusses embodiments of inventory system 10 that receive orders for various inventory items 32, 36, and 38, management module 15 may receive other orders and/or operations requests from any appropriate system or component, and may alternatively or additionally generate such orders and/or requests itself using any appropriate techniques.

After generating one or more task assignments, management module 15 may select appropriate components to complete particular tasks and transmits task assignments to selected components to trigger completion of the relevant tasks. The relevant components then execute their assigned tasks. Each task assignment defines one or more tasks to be completed by a particular component. These tasks may relate to the retrieval, storage, replenishment, and counting of inventory items 32, 36, 38 and/or the management of mobile drive units 20, inventory holders 30, climate-controlled inventory holders 34, container holders 40, stations 50 and other components of inventory system 10. Depending on the component and the task to be completed, a particular task assignment may identify locations, components, and/or actions associated with the corresponding task and/or any other appropriate information to be used by the relevant component in completing the assigned task.

While the appropriate components of inventory system 10 complete assigned tasks, management module 15 may interact with the relevant components to ensure the efficient use of space, equipment, manpower, and other resources available to inventory system 10. For example, management module 15 may receive information from the various components of system 10 regarding their current location, state, and/or other characteristics. Based on its knowledge of the location, current state, and/or other characteristics of the various components of inventory system 10 and an awareness of tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10 involving inventory items 32, cool inventory items 36, and frozen inventory items 38.

As a result, some embodiments of management module 15 may, by implementing one or more management techniques described below, enhance the efficiency of inventory system 10 and/or provide other operational benefits. For example, management module 15 may prioritize, schedule, or otherwise account for the desirability of keeping cool inventory items 36 and/or frozen inventory items 38 at or near their respective target temperatures. In particular embodiments, inventory items 36 and/or 38 may, depending on particular embodiments of inventory holder 34, be disconnected from refrigeration while being transported by mobile drive units 20. Accordingly, in some embodiments, management module 15 may monitor the temperature of such inventory items and issue, reorder, and/or reprioritize task assignments in order to reduce and/or minimize the time such inventory items are not kept at or near target temperatures. It should be noted, however, that in some embodiments of inventory holder 34, inventory holder 34 may remain connected to a refrigeration while being transported by mobile drive unit 20. A more detailed description of example operations of management module 15 is discussed below with respect to FIGS. 2-8.

Mobile drive units 20 move inventory holders 30 and/or inventory holders 34 between locations within a workspace associated with inventory system 10. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered robotic devices configured to freely move about the associated workspace. In alternative embodiments, mobile drive units 20 represent elements of a tracked inventory system 10 configured to move inventory holder 30 along tracks, rails, cables, or other guidance elements traversing the associated workspace. In such embodiments, mobile drive units 20 may receive power through a connection to the guidance elements, such as a powered rail.

Mobile drive units 20 may transport inventory holders 30, climate-controlled inventory holders 34, and/or container holders 40 by docking with and/or coupling to a particular holder and moving the holder while docked. For example, as illustrated, mobile drive units 20 are transporting inventory holder 34 and inventory holder 30. For sake of simplicity, the transportation of inventory holder 30 is described in more detail, but the following description may similarly apply to inventory holder 34 and/or container holder 40. Mobile drive units 20 transport inventory holder 30 by moving beneath inventory holder 30 and lifting a docking head that interfaces with a portion of inventory holder 30. The docking head may be controlled by an actuator of mobile drive unit 20 operable to lift inventory holder 30 when docked. The docking head of mobile drive unit 20 may couple mobile drive unit 20 to inventory holder 30 and/or support inventory holder 30 when mobile drive unit 20 is docked to inventory holder 30. Mobile drive unit 20 may utilize the docking head to maneuver inventory holder 30, such as by lifting inventory holder 30, propelling inventory holder 30, rotating inventory holder 30, and/or moving inventory holder 30 in any other appropriate manner. The docking head of mobile drive unit 20 may also include any appropriate combination of components to facilitate such manipulation of inventory holder 30. For example, in some embodiments, a high-friction portion may form all or a portion of the docking head, which abuts a portion of inventory holder 30 while mobile drive unit 20 is docked to inventory holder 30. In such embodiments, frictional forces created between the high-friction portion of the docking head and a surface of inventory holder 30 may induce translational and rotational movement in inventory holder 30 when mobile drive unit 20 actuates docking head.

In some embodiments mobile drive unit 20 may be capable of rotating its docking head to rotate inventory holder 30 while moving and/or while stopped. In addition or in the alternative, mobile drive unit 20 may be capable of rotating the docking head independently or as a part of the movement of mobile drive unit 20 as a whole. For example, mobile drive unit 20 may rotate inventory holder 30 as mobile drive unit 20 executes a turn such that inventory holder 30 continues to face the original direction of movement. While lifted, mobile drive unit 20 may control another actuator or actuators driving power to its wheels. Using the wheel actuators, mobile drive unit 20 may be capable of transporting inventory holder 30 while the docking head is lifting inventory holder 30 or while mobile drive unit is undocked and/or uncoupled from inventory holder 30. As illustrated, mobile drive unit 20 includes a pair of stabilizer wheels in addition to the motorized wheels powered by one or more actuators.

It should be noted that while a particular method of docking with inventory holder 30 is illustrated, mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within inventory system 10. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30. Moreover, as noted above, mobile drive unit 20 may be often able to dock with climate-controlled inventory holders 34 and container holders 40 in a similar manner as described above for inventory holder 30.

Mobile drive units 20 may be capable of connecting and/or disconnecting particular embodiments of climate-controlled inventory holders 34 with refrigerated air and/or a power source that powers a refrigeration unit of inventory holder 34. For example, while docked with a particular inventory holder 34 that has an intake vent for connecting to an HVAC system, mobile drive units 20 may be capable of aligning the vent of the particular inventory holder 34 with an outlet vent of the HVAC system at a storage or other location in inventory system 10. As another example, mobile drive units 20 may be capable of aligning electrical contacts on inventory holder 34 that power an on-board electric refrigeration unit of inventory holder 34 with an electrical outlet at a storage or other location in inventory system 10. A more detailed explanation of the operation of mobile drive units 20 with respect to example embodiments of inventory holders 34 is discussed in greater detail below with respect to FIGS. 2-4.

Mobile drive units 20 may be capable of communicating with management module 15 to receive information identifying selected inventory holders 30, transmit locations of mobile drive units 20, or exchange any other suitable information used by management module 15 or mobile drive units 20 during operation. Mobile drive units 20 may communicate with management module 15 wirelessly, using wired connections between mobile drive units 20 and management module 15, and/or in any other appropriate manner. As one example, some embodiments of mobile drive unit 20 may communicate with management module 15 and/or with one another using Wi-Fi (IEEE 802.11), Bluetooth (IEEE 802.15), Infrared Data Association standards, or any other appropriate wireless communication protocol. As another example, in a tracked inventory system 10, tracks or other guidance element upon which mobile drive units 20 move may be wired to facilitate communication between mobile drive units 20 and other components of inventory system 10.

Inventory holders 30 store ambient inventory items 32. Inventory holders 30 may store inventory items 32 at an ambient and/or room temperature. Ambient and/or room temperature may be the temperature or temperatures at which one or more common areas of inventory system 10 are generally kept by an HVAC system. In some embodiments, inventory holders 30 include multiple storage bins with each storage bin capable of holding a different type of inventory item 32. Inventory holders 30 are capable of being carried, rolled, or otherwise moved by mobile drive units 20. In some embodiments, inventory holder 30 may provide additional propulsion to supplement that provided by mobile drive unit 20 when moving inventory holder 30. Additionally, in particular embodiments, each inventory holder 30 may have a plurality of faces, and each bin may be accessible through specific faces of the relevant inventory holder 30. Mobile drive units 20 may be configured to rotate inventory holders 30 at appropriate times to present particular faces of inventory holders 30 and the associated bins to an operator or other components of inventory system 10. For ease of reference, inventory holders 30 may be referred to herein as ambient inventory holders 30 and/or room-temperature inventory holders 30, although it should be noted that particular inventory holders 30 may be stored at a variety of temperatures and/or climates, including temperatures other than ambient and/or room temperature.

Ambient inventory items 32 represent any objects suitable for storage, retrieval, and/or processing in an automated inventory system 10 at ambient climate conditions and/or room temperatures. Such inventory items 32 may generally be suitable for keeping in a range of temperatures, including room temperature, without ruining, melting, or spoiling. Accordingly, such inventory items 32 may be kept in a portion of a warehouse or storage facility that does not have climate control and/or has an HVAC system that generally keeps the warehouse or facility at acceptable ambient climate conditions and/or room temperatures. Room temperatures may, for example, include temperatures ranging from 65° Fahrenheit (F) to 75° F. For example, inventory items 32 may include canned goods, boxed foods, mechanical items, and other inventory that does not generally require refrigeration. It should be noted, however, that particular ambient inventory items 32 may be stored at cool or frozen temperatures in addition to room-temperatures. During operation, mobile drive units 20 may retrieve inventory holders 30 containing one or more ambient inventory items 32 requested in an order to be packed in a container 42 for delivery to a customer. Additionally or alternatively, management module 15 may determine to pack an ambient inventory item 32 in containers 44 and/or 46 along with cool inventory items 36 and/or frozen inventory items 38 that are also on an order based at least in part on determining that ambient inventory item 32 are capable of being stored at cool and/or frozen temperatures. Moreover, in particular embodiments of inventory system 10, boxes containing completed orders may themselves represent inventory items. For ease of reference, inventory items 32 may be referred to herein as ambient inventory items 32 and/or room-temperature inventory items 32, although it should be noted that particular inventory items 32 may be stored at a variety of temperatures, including temperatures other than ambient and/or room temperature, including ranges of temperatures higher and/or lower than the specific examples provided above.

Climate-controlled inventory holders 34 store cool inventory items 36 and/or frozen inventory items 38 at one or more appropriate controlled climates. Climate-controlled inventory holders 34 may represent an embodiment of inventory holder 30 designed and/or designated for storing cool inventory items 36 and/or frozen inventory items 38. Climate-controlled inventory holders 34 represent any suitable combination of components, structure, and/or machinery to hold cool inventory items 36 and/or frozen inventory items 38 at or near one or more target temperatures appropriate for those items. Additionally or alternatively, climate-controlled inventory holders 34 may be capable of controlling other climate conditions as appropriate for particular inventory items 36 and/or 38. For example, climate-controlled inventory holders 34 may include humidifiers and other appropriate components to store cool inventory items 36, such as vegetables, at a high humidity. In some embodiments, climate-controlled inventory holders 34 may store only cool inventory items 36, while some embodiments of climate-controlled inventory holders 34 may store only frozen inventory items 38. Moreover, other embodiments may store cool inventory items 36 and frozen inventory items 38. Accordingly, inventory holders 34 may be capable of keeping different portions of inventory holders 34 at different target temperatures. For example, one or more shelves or bins of inventory holder 38 may be in a frozen compartment or zone, while one or more other shelves may be in a refrigerated or cool compartment or zone.

Climate-controlled inventory holders 34 may include suitable insulation for facilitating keeping inventory items 36 and/or 38 at or near their respective target temperatures while also allowing access to those items. The insulation may at least partially insulate inventory items in inventory holders 34 from ambient temperatures surrounding inventory holders 34. For example, as illustrated, climate-controlled inventory holders 34 include strip insulation curtains mounted along an outer portion of the inventory holder 34. As illustrated, the top portions of the strip curtains are mounted at or near the top of inventory holder 34 while the bottom portion of the strip curtains move freely. The strip curtains may allow access to inventory items 36 and/or 38 between the various strips while impeding air flow between the interior and exterior of inventory holder 38. It should be noted, however, that while illustrated as having strip curtains for insulation, any suitable form of insulation may be used. For example, inventory holders 34 may include insulated side walls and/or insulated doors configured to open and close. Doors allowing access to inventory items 36 and/or 38 may be mounted on one side of inventory holder 34 and/or up to all sides of inventory holder 34. In some embodiments, inventory holder 34 may include no insulation and/or may be substantially similar to inventory holder 30. In such embodiments, inventory holder 34 may merely be designated as a climate-controlled inventory holder based on being designated for storing inventory items 36 and/or 38 in one or more climate-controlled zones of inventory system 10. Accordingly, climate-controlled inventory holder 34 may simply be designated as a climate-controlled inventory holder 34 based on a particular climate-controlled zone of a warehouse in which it stores inventory items 36 and/or 38.

Climate-controlled inventory holders 34 may be configured to receive refrigeration from an outside source and/or may include suitable components to produce refrigeration. For example, climate-controlled inventory holders 34 may include one or more vents that may be connected to an outlet vent of an HVAC system of the inventory system 10. A more detailed description of such an embodiment is discussed below with respect to FIG. 2. As another example, climate-controlled inventory holders 34 may include one or more on-board electric refrigeration units that receive power from the inventory system 10 and produce refrigeration internally to inventory holder 34. More detailed descriptions of such embodiments are discussed below with respect to FIGS. 2 and 3.

Cool inventory items 36 represent any objects suitable for storage, retrieval, and/or processing in an automated inventory system 10 at temperatures below room temperature. Such objects may represent goods that are appropriate for refrigeration at cool temperatures. Cool temperatures, for example, may prevent, inhibit, and/or delay melting, spoliation, and/or ruin of those goods. Temperatures may, for example, include temperatures ranging from just over 32° Fahrenheit (F) to 55°+F. Cool inventory items 36 may represent a class and/or type of inventory item 32 that is classified based on a target storage temperature and/or other target climate condition such as humidity. For example, cool inventory items 36 may represent produce such as fruits and vegetables, dairy products, or other items that generally benefit from cool temperatures and/or high humidities. Mobile drive units 20 may, during operation, retrieve inventory holders 34 containing one or more cool inventory items 36 requested in an order to be packed for delivery to a customer. For ease of reference, cool inventory items 36 are referred to herein as "cool" inventory items 36, although it should be noted that particular inventory items 36 may be stored at a variety of temperatures, including ranges of temperatures higher and/or lower than the specific examples provided above.

Frozen inventory items 38 any objects suitable for storage, retrieval, and/or processing in an automated inventory system 10 at freezing temperatures. Such objects may represent goods that should generally be kept frozen to prevent, inhibit, and/or delay melting, spoliation, and/or ruin of those goods. Temperatures may, for example, include temperatures at or below 32° F. Frozen inventory items 38 may represent a class and/or type of inventory item 32 that is classified based on a target storage temperature and/or other target climate condition such as humidity. For example, frozen inventory items 32 may include frozen goods, such as frozen meals, frozen vegetables, iced products, frozen dessert products, and other frozen food items. Mobile drive units 20 may, during operation, retrieve inventory holders 34 containing one or more frozen inventory items 38 requested in an order to be packed for delivery to a customer. For ease of reference, frozen inventory items 38 are referred to herein as "frozen" inventory items 36, although it should be noted that particular inventory items 38 may be stored at a variety of temperatures, including ranges of temperatures higher and/or lower than the specific examples provided above. Moreover, while described as "frozen," a particular inventory item 38 need not necessarily be frozen. For example, particular inventory items 38 may have freezing points below the freezing point of water and/or below the temperatures at which frozen inventory items 38 are kept.

For the purposes of this description, "inventory items" may represent any one or more objects of a particular type that are stored in inventory system 10. For example, a given inventory item 32, 36, and/or 38 may represent a single stock-keeping unit (SKU) of a unique inventory item. Thus, inventory item 32, 36, and/or 38 may refer to a particular item and/or may refer to a quantity of items having a particular SKU as appropriate. Moreover, while example types of inventory items are described above as being ambient, cool, and frozen, these types are provided by way of example only and inventory system 10 may be capable of storing and coordinating orders for any number and/or types of inventory items, including inventory items that are appropriate for storing at various climate controlled conditions, such as high humidity and/or low humidity.

Container holders 40 hold containers 42, 44, and 46 in which inventory items 32, 36, and 38 may be grouped. For example, container holders 40 may be configured to store orders for various inventory items 32. As another example, container holders 40 may be configured to holder empty containers 42, 44, and/or 46 so that appropriate containers ready to receive inventory items 32, 36, and/or 38 may be transported to stations 50 for order assembly. Container holders 40 may have any appropriate structure and may be configured to store containers 42, 44, and/or 46 in any suitable manner based on the type of containers utilized in inventory system 10 or any other appropriate factors. In some embodiments, container holders 40 represent a type of inventory holder configured to carry pallets and that can be moved by mobile drive units 20. Container holders 40 may include one or more platform or shelves on which containers 42, 44, and/or 46 rest. Additionally or alternatively, container holders 40 may include a plurality of bins each holding containers 42, 44, and/or 46 of a different size or type.

Containers 42 represent any appropriate form of container into or onto which inventory items 32 may be placed for storage, shipping, or other appropriate purposes. Examples of containers 42 include, but are not limited to, boxes, pallets, bins, totes, cartons, and envelopes. In particular embodiments, containers 42 are independent of the container holders 40 in which containers 42 are stored, and as a result, containers 42 may be removed from container holders 40 for processing or transferred to other container holders 40. As one example, containers 42 may represent boxes in which or pallets on which inventory items 32 associated with a particular order may be stored for delivery, and the relevant container 42 may then be shipped to a customer associated with that order. As another example, containers 42 may represent bins or other containers in which inventory items 32 may be placed for long term storage and then moved to a special location or removed from inventory system 10.

Containers 44 and 46 respectively represent containers 40 into which cool inventory items 36 and frozen inventory items 38 may be placed for storage, shipping, or other appropriate purposes. For example, containers 44 may be a special type of container designated and/or designed to insulate cool inventory items 36 during shipment. Likewise, containers 46 may be another type of container designated and/or designed to insulate and/or keep frozen inventory items 38 frozen during shipment. Containers 44 and/or 46 may include and/or be formed of insulated materials, such as Styrofoam. Containers 46 may, for example, include compartments and/or containers for dry ice or other packing materials appropriate for keeping the interior portion or portions of containers 46 at or near a freezing temperature. Management module 15 may be operable to select a particular type of container 42, 44, and/or 46 for shipping inventory items 32, 36, and/or 38 based on the class of inventory items on the order.

Stations 50 represent locations designated for the completion of particular tasks involving inventory items 32, 36, and/or 38. Such tasks may include the removal of inventory items 32, 36, and/or 38 from inventory holders 30 and/or 34, the introduction of inventory items 32, 36, and/or 38 into inventory holders 30 and/or 34, the counting of inventory items 32, 36, and/or 38 in inventory holders 30 and/or 34, the decomposition of inventory items 32, 36, and/or 38 (e.g., from pallet- or case-sized groups to individual inventory items), and/or the processing or handling of inventory items 32, 36, and/or 38 in any other suitable manner. In some embodiments, stations 50 may just represent the physical locations where a particular task involving inventory items can be completed within inventory system 10. Alternatively or in addition, stations 50 may represent both the physical location and also any appropriate equipment for processing or handling inventory items 32, 36, and/or 38, such as scanners for monitoring the flow of inventory items 32, 36, and/or 38 in and out of inventory system 10, communication interfaces for communicating with management module 15, and/or any other suitable components. Stations 50 may be controlled, entirely or in part, by human operators or may be fully automated. In some embodiments, the operator may be automated equipment. Moreover, the human or automated operators of stations 50 may be capable of performing certain tasks to inventory items 32, 36, and/or 38, such as packing or counting inventory items 32, 36, and/or 38, as part of the operation of inventory system 10. Although "station" as used in the following description refers to locations at which any appropriate processing operation supported by inventory system 10 may be completed, particular embodiments of inventory system 10 may include specialized stations 50 suitable for performing only a single processing task supported by inventory system 10, as will be discussed in greater detail with respect to FIG. 5. Moreover, a particular embodiment of inventory system 10 may include stations 50 that are, in general, capable of handling multiple types of operations but, at any given time, configured to handle only one particular type of operations.

In general, orders for ambient inventory items 32, cool inventory items 36, and frozen inventory items 38 are filled using station 50. Cool inventory items 36 and frozen inventory items 38 may be kept at or near their respective target temperatures by climate-controlled inventory holders 34. Management module 15 may instruct mobile drive units 20 to transport particular inventory holders 30 storing ambient inventory items 32 requested by particular orders to stations 50 for fulfillment. Management module 15 may instruct other mobile drive units 20 to transport particular climate-controlled inventory holders 34 storing cool inventory items 36 and/or frozen inventory items 38 requested by particular orders to the same or different stations 50 for fulfillment. Container holders 40 may carry empty containers to stations 50 so that requested inventory items can be placed into appropriate containers for shipment. For example, ambient inventory items 32 may be placed into containers 42, cool inventory items 36 may be placed into containers 44, and frozen inventory items 38 may be placed into containers 46. After container holders 40 receive appropriate inventory items into its various containers, container holders 40 may be transported to a shipping station for shipment to another facility or end-user. For example, using system 10, an online grocer may facilitate the delivery of fresh goods and produce to a customer.

Figure 2:
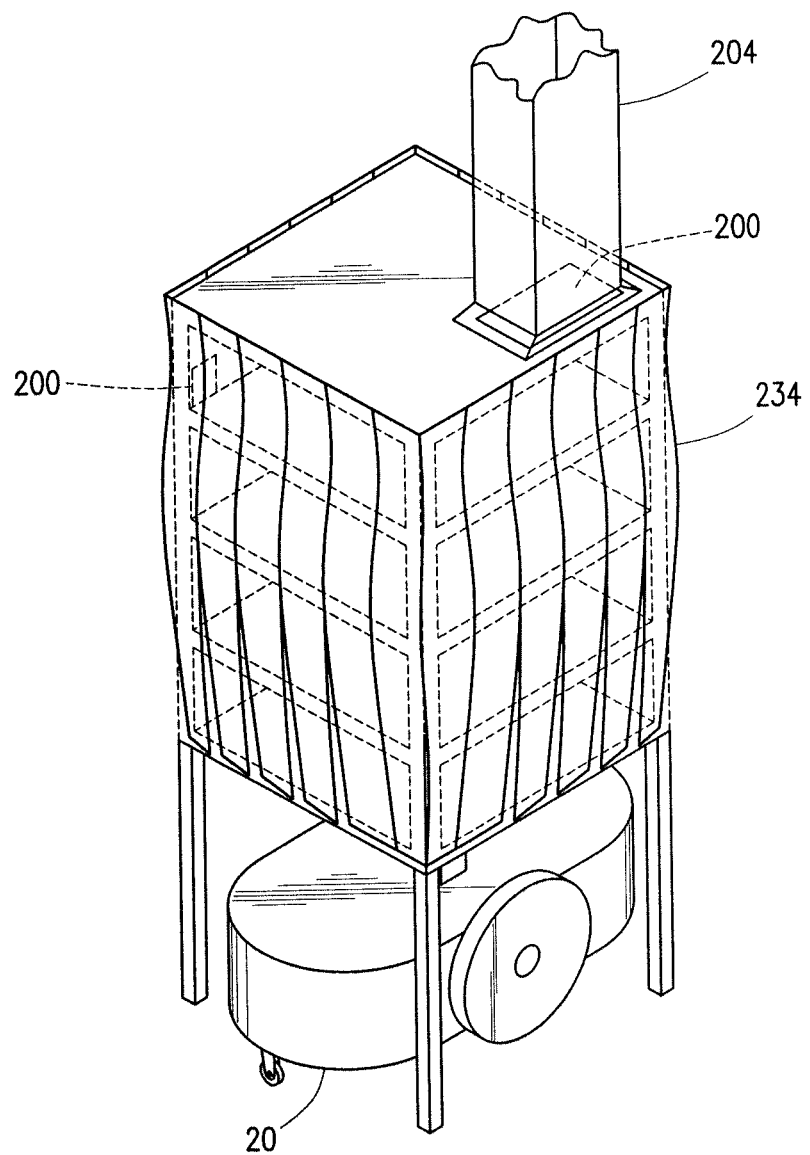
FIG. 2 is a perspective drawing illustrating an example embodiment of a climate-controlled inventory holder.

FIGS. 2 to 4 illustrate particular example embodiments of a climate-controlled inventory holder 34 including inventory holder 234, holder 334, and inventory holder 434. Embodiments of inventory holder 34 described below may correspond to various embodiments of inventory system 10 and/or may be combinable into a single embodiment of inventory system 10.

FIG. 2 is a perspective drawing illustrating an example embodiment of a climate-controlled inventory holder 234. Inventory holder 234 represents a particular embodiment of inventory holder 34, which is described above. As illustrated, inventory holder 234 includes an intake vent 200 that may be connected to an internal ventilation system (not illustrated) and one or more temperature sensors 202. Generally, inventory holder 234 is configured to apply refrigeration from outlet vent 204 to one or more inventory items 36 and/or 38 stored on shelves or bins of inventory holder 234.

Intake vent 200 represents a cooling duct and/or ventilation opening operable to receive refrigerated air from outlet vent 204 of an external HVAC system (not illustrated). In some embodiments, intake vent 200 may be connectable to outlet vent 204. Intake vent 200 may form an intake to an internal ducting system of inventory holder 234 that allows refrigerated air to be received from intake vent 200 and distributed to the various shelves, compartments, and/or bins of inventory holder 234. Alternatively or in addition, inventory shelves within inventory holder 234 may be made of a grating, wire mesh, or other porous material that allows air to flow through shelves from intake vent 200. When in proximity to outlet vent 204, intake vent 200 may receive refrigerated air that may be at a cool and/or at a frozen temperature as appropriate for inventory items 36 and/or 38. It should also be understood that while being illustrated as a single intake vent, intake vent 200 may represent more than one intake vent that are each able to receive different temperature supply air. For example, intake vent 200 may be configured as two vents, one to receive cool air corresponding to one portion of inventory holder 234 storing cool inventory items 36 and another to receive freezing-temperature air corresponding to another portion of inventory holder 234 storing frozen inventory items 38.

Temperature sensor 202 may be any appropriate device or sensor capable of measuring the internal temperature of inventory holder 234. Temperature sensor may include multiple sensors that each measure the temperature of various bins, shelves, and compartments of inventory holder 234. Temperature sensor 202 may be capable of communicating temperature information to management module 15. For example, temperature sensor 234 may include one or more wireless interfaces to wirelessly transmit information to management module 15. Temperature sensor 200 may additionally or alternatively transmit other information to management module 15, such as information identifying a particular temperature sensor 202 and/or inventory holder 234.

Outlet vent 204 may represent any appropriate outlet vent of an HVAC duct configured provide refrigerated air at one or more temperatures appropriate for cool inventory items 36 and/or frozen inventory items 38 stored by inventory holder 234. The HVAC system may, for example, be a centralized heating and cooling system associated with inventory system 10. The HVAC system may have multiple outlet vents 204 at various locations in inventory system 10 at which inventory holder 234 may be connected to receive refrigerated air. The locations may be situated such that an outlet vent 204 may be available at various storage and/or waiting locations within inventory system 10, such as at inventory stations 50, drift locations, and/or various storage areas within inventory system 10.

Mobile drive unit 20 is operable to move beneath inventory holder 234 in order to dock, lift, or otherwise couple to inventory holder 234. Accordingly, outlet vent 204 may include one or more collapsible portions, which may allow inventory holder 234 to be lifted without damaging outlet vent 204. Intake vent 200 and/or outlet vent 204 may additionally or alternatively include one or more catches, latches, or sliding mechanisms to facilitate connecting and disconnecting intake vent 200 and outlet vent 204. Additionally or alternatively, intake vent 200 may include one or more louvers configured to at least partially close an opening to the intake vent when the intake vent 200 is disconnected from the outlet vent 204. In some embodiments, outlet vent 204 may include a similar louver configured to at least partially close when intake vent 200 is disconnected. Such louvers may facilitate the prevention of refrigerated air from escaping from intake vent 200 and/or outlet vent 204 while disconnected from each other.

Mobile drive unit 20 may include one or more appropriate sensors to align inventory holder 234 to a particular portion of inventory system 10 such as a reference point with a known spatial relationship to outlet vent 204. Once appropriately aligned, mobile drive unit 20 may move inventory holder 234 such that the catches, latches, and/or sliding mechanism engage and thereby cause inlet vent 200 to connect to outlet vent 204. In addition or in the alternative, mobile drive unit 20 align intake vent 200 beneath outlet vent 204 without making a physical connection between outlet vent 204 and intake vent 200.

In operation, each outlet vent 204 in inventory system 10 may be able to supply climate-controlled air at selected temperatures to a given inventory holder 234 while connected to a particular inventory holder 234. Inventory holder 234 may receive refrigerated air from vents 200 and 204 while, for example, stored in a storage area of inventory system 10. Accordingly, cool inventory items 36 and/or frozen inventory items 38 may be kept at or near target temperatures while inventory holder 234 is connected to outlet vent 204. Temperatures of the air at outlet vents may be independently controllable by management module 15. Additionally or alternatively, flow, temperature, humidity, and other characteristics of the supply of air from outlet vent 204 may be independently controllable by management module 15. Management module 15 may track particular inventory holders 234 connected to particular outlet vents 204 and/or may select particular characteristics of the supply of air appropriate for the particular inventory holder 234 based on the inventory and/or inventory types stored by that inventory holder 234. Management module 15 may additionally or alternatively be capable of operating the HVAC system to keep various portions of inventory holder 234 at or near target temperatures based on receiving temperature information from temperature sensor 202.

Management module 15 may select inventory holder 234 for transportation to station 50 based on determining that one or more inventory items 36 and/or 38 stored by that inventory holder 234 are requested by one or more orders. In response to determining to fulfill an order with one or more inventory items 36 and/or 38 stored by inventory holder 234, management module 15 may instruct mobile drive unit 20 to move to inventory holder 234, lift inventory holder 234, and transport inventory holder 234 to a particular station 50. Mobile drive unit 20 moving inventory holder 234 may cause intake vent 200 of inventory holder 234 to disconnect from outlet vent 204. For example, a sliding mechanism, latch, or catch may disengage. While disconnected from refrigeration, inventory items 36 and/or 38 may not receive refrigeration. Accordingly, because inventory holder 234 may be stored in a room-temperature zone of inventory system 10, the internal temperature of inventory holder 234 including inventory items 36 and/or 38 may eventually rise to room temperature if not returned to an outlet vent 204 within an acceptable time. Management module 15 may be capable of calculating an estimated time that is acceptable for inventory holder 234 to be disconnected from refrigeration based on the amount of time estimated for the temperature of inventory items 36 and/or 38 to rise beyond a predetermined threshold. In addition or in the alternative, management module 15 may track the temperatures of inventory items 36 and/or 38 based on temperature information received from temperature sensor 202.

Management module 15 may use various techniques to ensure that inventory holder 234 is disconnected from refrigeration for acceptable time durations and/or reconnected to refrigeration before that time expires. For example, management module may prioritize orders for inventory items 36 and/or 38, prioritize processing of inventory items 36 and/or 38, may schedule transportation of inventory holder 234 at times when traffic is acceptable, and/or may determine to fill an order for an ambient inventory item 32 at a later time than otherwise would occur. In some embodiments, management module 15 may utilize drifting techniques to cause inventory holders 30 to wait while inventory holders 234 are transported to station 50. These and other techniques are discussed in more detail below.

After requested inventory items 36 and/or 38 are received at station 50 and used to fill various orders, management module 15 may select a storage location for inventory holder 234. Selection may based on the availability of one or more outlet vents 204. Mobile drive unit 20 may then be instructed by management module 15 to transport inventory holder 234 to a selected storage location. Mobile drive unit 20 receives the instructions and may then transport inventory holder 234 to the selected storage location, where inventory holder 234 may be aligned with and/or reconnected to outlet vent 204.

FIG. 3 is a perspective drawing illustrating an example embodiment of a climate controlled inventory holder 334. Inventory holder 334 represents a particular embodiment of inventory holder 34, described above. As illustrated, inventory holder 334 also includes a mechanical arm 300 and refrigeration unit 338. Generally, inventory holder 334 is configured to apply refrigeration from refrigeration unit 338 to one or more cool inventory items 36 and/or frozen inventory items 38 stored on shelves or bins of inventory holder 334. Refrigeration unit 338 may receive electric power from wiring system 302 via mechanical arm 300.

Mechanical arm 300 includes any appropriate components to movably connect to a wiring system 302. Mechanical arm 300 is also electrically coupled to refrigeration unit 338 via a power cord or other electrical cabling. Mechanical arm 300 may receive electrical power from wiring system 302 and deliver power to refrigeration unit 338. In some embodiments, mechanical arm 300 may include a swiveling mechanism to allow mechanical arm 300 to rotate with respect to inventory holder 334. Thus, when inventory holder 334 is rotated by mobile drive unit 20, a portion of mechanical arm 300 in contact with wiring system 302 may remain in the same orientation with respect to wiring system 302. Mechanical arm 300 may include wiring, cabling, and/or electrical contacts operable to electrically couple wiring system 302 to a power input of refrigeration unit 338. Mechanical arm 300 may include one or more flexible portions that are configured to flex appropriately when inventory holder 334 is lifted by mobile drive unit 20.

Wiring system 302 represents appropriate cabling, mesh, or and/or other electrically conductive materials to transmit electrical power to one or more electrical contacts of mechanical arm 300 from a source of electricity. Mobile drive unit 20 may be operable to couple, dock, lift, or otherwise connect with inventory holder 334 in order to move inventory holder 334 to various locations within in inventory system 10. Wiring system 302 may be configured as an overhead source of power along various paths within inventory system 10, such that mobile drive unit 20 may move freely along paths created by wiring system 302 within inventory system 10. While inventory holder 334 is being transported by mobile drive unit 20, mechanical arm 300 may be configured to remain in contact with wiring system 302 such that inventory holder 334 receives a continuous and/or near-continuous supply of electrical power to refrigeration unit 338. Accordingly, inventory holder 334 may keep inventory items 36 and/or 38 at or near their target respective target temperatures while being moved by mobile drive unit 20. Moreover, while illustrated as being overhead to inventory holder 334, wiring system 302 may at any appropriate location in inventory system 10, such as on the floor or along tracks or cabling systems.

Refrigeration unit 338 represents any combination of appropriate components operable to produce and/or generate appropriate refrigeration for inventory holder 334. Refrigeration unit 338 may include appropriate compressors, radiators, and fans to form an electric refrigerator operable to cool the environment within inventory holder 334. Refrigeration unit 338 may connect to an internal ducting system that supplies refrigeration to cool inventory items 36 and/or frozen inventory items 38 stored on various shelves, compartments, and/or bins of inventory holder 334. Refrigeration unit 338 may be capable of operating in one or more refrigeration modes operable to deliver various target temperatures to inventory items 36 and/or 38. Alternatively or in addition, refrigeration unit 338 may represent multiple refrigeration units operable to produce and/or generate a supply of air at various temperatures including temperatures appropriate for cool inventory items 36 and/or temperatures appropriate for frozen inventory items 38.

During operation, inventory holder 334 applies refrigeration to inventory items 36 and/or 38. Refrigeration unit 338 may operate to keep those items at or near target temperatures. Management module 15 may instruct mobile drive unit 20 to move inventory holder 334 to various locations within inventory system 10, such as stations 50. While being moved by mobile drive units 20, inventory holder 334 may remain in contact with wiring system 300 and thus may continue to provide electrical power to refrigeration unit 338. Accordingly, inventory holder 334 may be capable of refrigerating inventory items 36 and/or 38 while being transported by mobile drive unit 20.

Management module 15 may select inventory holder 334 for transportation to station 50 based on determining that one or more cool inventory items 36 and/or frozen inventory items 38 stored by that inventory holder 334 are requested by one or more orders. In response to determining to fulfill an order with one or more inventory items 36 and/or 38 stored by inventory holder 334, management module 15 may instruct mobile drive unit 20 to move to inventory holder 234, lift inventory holder 234, and transport inventory holder 234 to a particular station 50. Management module 15 may calculate a path to a particular destination based on potential paths formed by wiring system 300. Mobile drive unit 20 may then be instructed by management module 15 to travel along those paths while transporting inventory holder 334. Accordingly, mechanical arm 300 may remain electrically coupled to wiring system 300 while moving.

FIGS. 4A, 4B, and 4C are perspective drawings illustrating an example embodiment of a climate-controlled inventory holder 434. Inventory holder 434 represents a particular embodiment of inventory holder 34, described above. As illustrated in FIG. 4A, inventory holder 434 includes temperature sensor 202, refrigeration unit 338, a power conduit 440, and one or more electrical contacts 436. Generally, inventory holder 334 is configured to apply refrigeration from refrigeration unit 338 to one or more cool inventory items 36 and/or frozen inventory items 38 stored on shelves or bins of inventory holder 434. Refrigeration unit 338 receives electric power from an electrical outlet 438 via electrical contacts 436 and power conduit 440. FIG. 4B illustrates an example embodiment of electrical contacts 436 mounted on a bottom surface of leg of inventory holder 434. FIG. 4C illustrates an example embodiment of electrical outlet 438.

Electrical contacts 436 may be situated in any appropriate portion of inventory holder 434 and may be configured to interface with electrical outlet 438. Electrical contacts 436a and 436b are configured to connect to and/or interface with electrical contacts 440a and 440b of electrical outlet 438. Electrical contacts 436 may be elongated conductive strips operable to receive electric power when in contact with contacts 440a and 440b of electric outlet 438. As illustrated, electrical contacts 436 are located at or near the base of inventory holder 434. Inventory holder 434 may include four vertical support members and/or legs configured to allow mobile drive unit 20 to pass into openings between the members to travel underneath inventory holder 434. As shown in more detail in FIG. 4B, electrical contacts 436a and 436b are mounted on the bottom surface of one of the legs. Moreover, while illustrated as elongated conductive strips, electrical contacts 436 may represent any appropriate electrical interface, including a 2-, 3-, or 4-pronged electrical plug or receptacle.

As shown in more detail in FIG. 4C, electrical outlet 438 includes electrical contacts 440a and 440b that may be configured to mate with electrical contacts 436a and 436b when the leg of inventory holder 434 is lowered onto electrical outlet 438 by mobile drive unit 20. Inventory system 10 may be configured with multiple electrical outlets 438 at various locations in inventory system 10 at which inventory holder 434 may be connected to receive electrical power for refrigeration unit 338. The locations may be placed so that an electrical outlet 438 may be available at various storage and/or waiting locations within inventory system 10, such as at inventory stations 50, drift locations, and/or various storage areas within inventory system 10. While illustrated as elongated conductive strips, electrical contacts 440a and 440b may represent any appropriate electrical interface, including a 2-, 3-, or 4-pronged electrical plug or receptacle.

Power conduit 440 represents a wire, cable, or electrical conduit configured to electrically couple a power input to refrigeration unit 338 to one or more electrical contacts 436. As illustrated, power conduit 440 runs along or inside one or more of the legs of inventory holder 434. It should be understood, however, that while a particular embodiment is illustrated, electrical contacts 436 may be configured any suitable manner to interface with electrical outlet 438. For example, electrical contacts 436 may, in some embodiments, be disposed on a side of inventory holder 434 and electrical outlet 438 may be disposed in a vertical position on a wall or vertical post or stand.

Mobile drive unit 20 may be capable of aligning inventory holder 434 to the electrical outlet 438 when lowering inventory holder 434 at particular locations in inventory system 10. Accordingly, mobile drive unit 20 may include one or more appropriate sensors to align inventory holder 434 to a particular portion of inventory system 10 such as a reference point with a known spatial relationship to electrical outlet 438. Once appropriately aligned, mobile drive unit 20 may move inventory holder 434 such that the electrical contacts 436a and 436b interface and/or mate with electrical contacts 440a and 440b. Thus, refrigeration unit 338 of inventory holder 434 may receive electrical power when inventory holder 434 is stored in a location that has an electrical outlet 438.

Management module 15 may select inventory holder 434 for transportation to station 50 based on determining that one or more inventory items 36 and/or 38 stored by that inventory holder 434 are requested by one or more orders. In response to determining to fulfill an order with one or more inventory items 36 and/or 38 stored by inventory holder 434, management module 15 may instruct mobile drive unit 20 to move to inventory holder 434, lift inventory holder 434, and transport inventory holder 434 to a particular station 50. Mobile drive unit 20 moving inventory holder 434 may cause electrical contacts 436 to disconnect from electrical outlet 438. While disconnected from refrigeration, inventory items 36 and/or 38 may not receive refrigeration. Accordingly, because inventory holder 434 may be stored in a room-temperature zone of inventory system 10, the internal temperature of inventory holder 434 including inventory items 36 and/or 38 may eventually rise to room temperature if not reconnected to a power source within an acceptable time. Accordingly, management module 15 may use various techniques to ensure that inventory holder 234 is disconnected from a power source for acceptable time durations, such as those discussed above with respect to inventory holder 234 of FIG. 2 and elsewhere in the disclosure. For example, management module 15 may select a location for storing inventory holder 434 based in part on determining that an electrical outlet 438 is available. As another example, management module 15 may plan, schedule, and/or prioritize fulfillment of orders and/or processing of inventory items 36 and/or 38 based on the detected temperature of inventory items 36 and/or 38 and/or on a time away from a source of electrical power, using techniques that are discussed in greater detail elsewhere in the disclosure.

In some embodiments, inventory holder 434 may include one or more batteries that provide a secondary and/or backup power source while inventory holder 434 is disconnected from electrical outlet 438. Batteries may be automatically charged while connected to electrical outlet 438. Management module 15 may be configured to detect the charge on the one or more batteries and may plan accordingly. For example, management module 15 may calculate an amount of estimated battery charge remaining and/or a corresponding battery time remaining. Management module 15 may plan, schedule, and/or prioritize fulfillment of orders and/or processing of inventory items 36 and/or 38 based on remaining battery life and/or duration, using techniques that are discussed in greater detail elsewhere in the disclosure.

Figure 5:
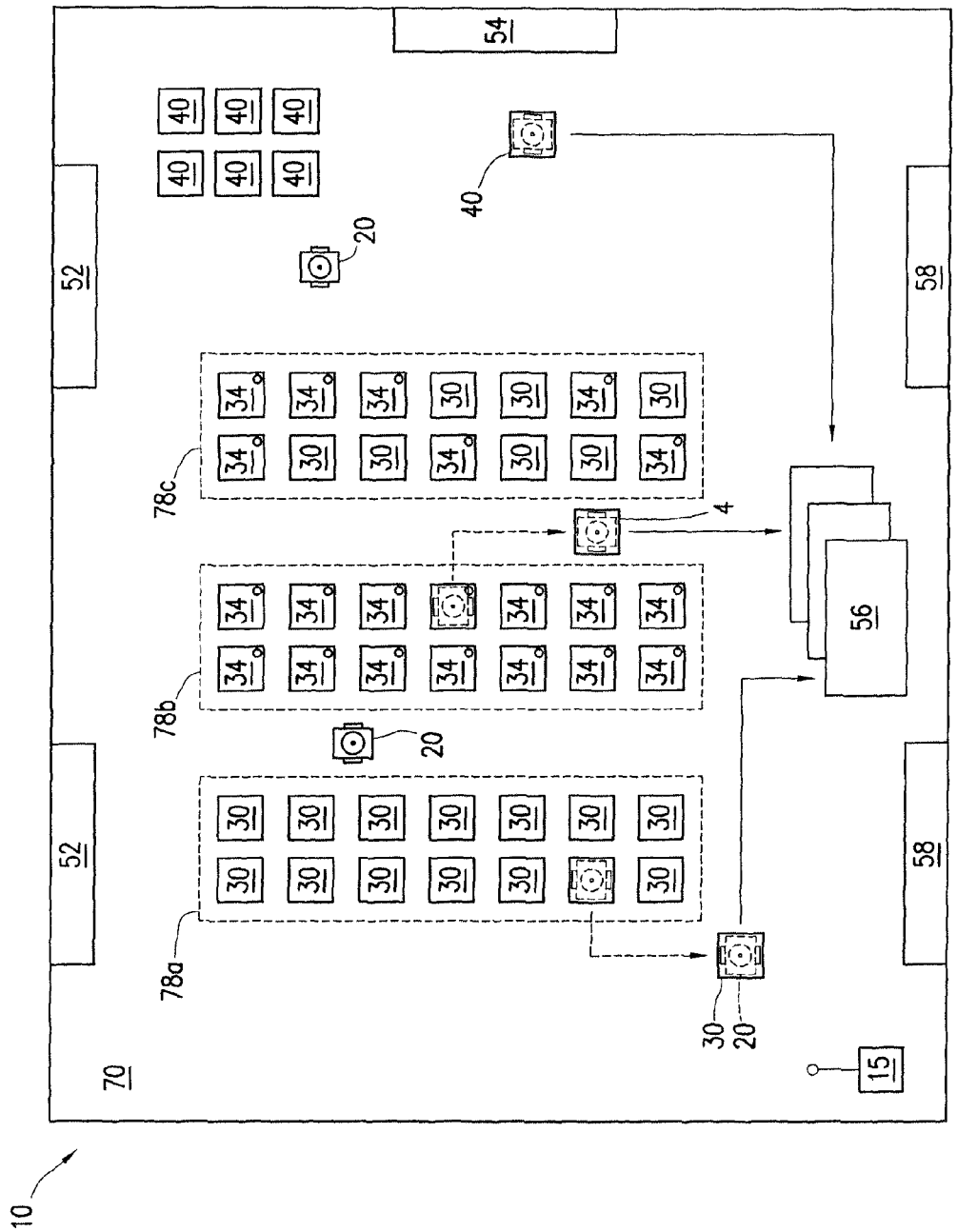
FIG. 5 is a block diagram of an example embodiment of an inventory system with climate-controlled inventory.

FIG. 5 is a block diagram of an example embodiment of an inventory system 10 with climate-controlled inventory. Inventory system 10 includes various components described above with respect to FIGS. 1-4 arranged in a workspace 70. Inventory system 10 includes various inventory holders 30 and/or climate-controlled inventory holders 34 (such as inventory holders 234, 334, and/or 434) stored in inventory storage 78. Inventory system 10 also includes one or more particular types of stations 50, such as receiving stations 52, induction stations 54, inventory stations 56, and/or shipping stations 58. In general, mobile drive units 20 transport inventory holders 30 and climate-controlled inventory holders 34 to various locations within inventory system 10 in response to commands received by management module 15. Replacement inventory items 32, 36, and/or 38 may be received into inventory system 10 at receiving stations 52. At inventory stations 56, inventory items 32, 36, and/or 38 are received from inventory holders 30 and/or climate-controlled inventory holders 34. While there, orders for those items are packed and/or readied for shipment. In some embodiments, induction stations 54 may be used to prepare container holders 40 with appropriate containers 42, 44 and 46 that may be used to pack those orders. At appropriate times, container holders 40 may be transported from induction stations 54 to inventory stations 56 so that those containers 42, 44 and 46 are available to respectively receive inventory items 32, 36 and/or 38. Once the inventory items 32, 36 and 38 have been placed into appropriate containers at inventory stations 56, mobile drive units may transport container holders 40 holding completed orders to shipping stations 58 so that they may be shipped to a final destination.

Receiving stations 52, induction stations 54, inventory stations 56, and shipping stations 58 represent particular stations 50 that include any appropriate components for processing or handling inventory items 32, 36, and/or 38, such as scanners for monitoring the flow of inventory items 32, 36, and/or 38 in and out of inventory system 10, communication interfaces for communicating with management module 15, and/or any other suitable components. Receiving stations 52, induction stations 54, inventory stations 56, and shipping stations 58 represent specialized stations so suitable for performing particular types of processing tasks supported by inventory system 10, as explained in more detail below.

Receiving stations 52 represent stations at which tasks associated with receiving replenishment and/or replacement inventory items 32, 36, and/or 38 take place. For example, receiving stations 52 may include a loading dock and appropriate processing equipment to intake new inventory items 32, 36, and/or 38 into inventory system 10. At receiving stations 52, new inventory may be received, broken down, handled, input into inventory system 10, and/or any other appropriate tasks associated with receiving inventory items 32, 36, and/or 38 into inventory system 10.

Induction stations 54 represent stations at which tasks associated with assembling and/or building container holders 40 and/or assembling containers 42, 44, and/or 46 for inventory items take place. For example, induction stations 54 may include appropriate materials and equipment to assemble containers 42, 44, and/or 46 and/or group containers into container holders 40. Interfaces at induction stations 54 may provide any appropriate components for assembling containers 42, 44, and/or 46, such as packing lists, packing materials, shipping labels, and materials related to other appropriate shipping and packaging tasks. Induction stations 54 may, in some embodiments, include appropriate devices and/or interfaces to instruct an operator of the induction station 54 how to assemble and/or group containers 42, 44, and/or 46 into container holders 40. For example, a given order may include requests for several inventory items 32, 36, and/or 38. An operator may be provided instructions with the types of containers 42, 44, and 46 to use and into which container holder 40 to place those containers. Particular containers 42, 44, and/or 46 may be associated with particular orders at induction stations 54. Thus, when container 42, 44, and/or 46 respectively receive an inventory item 32, 36, and/or 38, the "order" may be referred to as having received the inventory item 32, 36, and/or 38.

Inventory stations 56 represent stations at which tasks related to fulfilling orders take place. At inventory stations 56, inventory items 32, 36, and/or 38 may be picked and/or removed from inventory holders 30 and/or 34 and/or placed into containers 42, 44, and/or 46 of container holders 40. Inventory stations 56 may include appropriate equipment to instruct an operator to remove a particular ambient inventory item 32 from inventory holder 30 or cool inventory item 36, and/or frozen inventory item 38 from inventory holder 34 and place the inventory items into an appropriate container in container holder 40. In some embodiments, inventory stations 56 may interface with conveyance equipment capable of transporting containers to shipping stations 58 for shipment. Thus, when a particular order is complete, its associated container may be removed from container holder 40 and placed onto the conveyance equipment for delivery to shipping station 58. In addition or in the alternative, mobile drive unit 20 may move container holder 40 away from inventory station 56 and transport order holder 40 to shipping station 58.

In some embodiments, inventory system 10 may include multiple inventory stations 56. Inventory stations 56 may be designated for fulfilling orders for particular types of inventory items. For example, one inventory station 56 may be designated for fulfilling orders for ambient inventory items 32. Another inventory station may be designated for fulfilling orders for cool inventory items 36 and another inventory station may be designated for fulfilling orders for frozen inventory items 38. In some embodiments, a particular inventory station 56 may be designated for fulfilling any combination of the above-mentioned inventory items, including, for example, an inventory station 56 that fulfills orders for ambient inventory items 32, cool inventory items 36 and/or frozen inventory items 38.

Shipping stations 58 represent locations at which orders may be shipped to a destination, such as an end-user and/or specified shipping destination for the orders. For example, shipping stations 58 may include loading docks and appropriate processing equipment to ship containers 60 from inventory system 10. In some embodiments, shipping stations 58 and receiving stations 52 may be at similar or same locations.

Workspace 70 of inventory system 10 represents an area associated with inventory system 10 in which mobile drive units 20 can move, inventory holders 30, inventory holders 34, and container holders 40 can be stored and/or orders can be assembled. For example, workspace 70 may represent all or part of the floor of a distribution center in which inventory system 10 operates. Moreover, although FIG. 5 shows, for the purposes of illustration, an embodiment of inventory system 10 in which workspace 70 includes a fixed, predetermined, and finite physical space, particular embodiments of inventory system 10 may include mobile drive units 20, inventory holders 30, and inventory holders 34 that are configured to operate within a workspace 70 that is of variable dimensions and/or arbitrary geometry. Workspace 70 may be controlled by a central HVAC system that sets the ambient temperature to an appropriate room temperature. In some embodiments, however, workspace 70 may represent a warehouse or other facility that does not have a centralized HVAC system and/or is subject to outside temperatures. Thus, inventory holders 30 and/or inventory holders 34 may generally be stored at ambient temperatures and/or room temperatures within workspace 70.

Workspace 70 may include appropriate infrastructure to support climate-controlled inventory holders 34 such as the infrastructure discussed above with respect to inventory holders 234, 334, and/or 434. For example, workspace 70 may include an HVAC system configured with outlet vents 204 at various embodiments to provide refrigerated air to inventory holders 234. Outlet vents 204 may be configured at, for example, the locations at which inventory holders 30 and/or inventory holders 34 are stored in storage areas 78. Outlet vents 204 also may be provided at various other locations such as waiting or drift locations proximate to the various stations. As another example, workspace 70 may include wiring system 300 to provide electrical power to refrigeration units 338 in inventory holders 334. Wiring system 300 may provide electrical power along paths between receiving stations 52, storage areas 78, induction stations 54, inventory stations 56, and/or shipping stations 58. As another example, electrical outlets 438 may be configured at various locations, such as the locations at which inventory holders 30 and/or inventory holders 34 are stored in storage areas 78. Electrical outlets 438 also may be provided at various other locations such as waiting or drift locations proximate to the various stations.

Storage areas 78 may represent various areas designated for storing inventory holders 30 and/or inventory holders 34 within workspace 70. For example, storage area 78a may represent an area designated solely for storing inventory holders 30 which, as noted above, store ambient inventory items 32. Storage area 78b may represent an area designated for storing solely climate-controlled inventory holders 34. Storage area 78b may thus include appropriate infrastructure to support those inventory holders 34, as explained above. Storage area 78c may represent an area designated for a mixture of inventory holders 30 and climate-controlled inventory holders 34. Storage area 78c may also include appropriate infrastructure to support climate-controlled inventory holders 34. Management module 15 may, in some embodiments, be capable of selecting a storage location for a particular inventory holder 30 that includes infrastructure to support inventory holders 34 even if that inventory holder 30 may not utilize the infrastructure. Management module 15, however, may give priority to such storage locations to inventory holders 34. For example, management module 15 may select a storage location for inventory holder 30 that does not include infrastructure for inventory holders 34 over storage locations that do include such infrastructure. Management module 15 may select a storage location with such infrastructure for inventory holder 30 to be stored if, for example, other storage locations are not available. It should also may be noted that in particular embodiments of inventory system 10, workspace 70 may include all, some, or none of the above combinations of storage areas 78.

In operation, orders for inventory items 32, 36 and 38 are filled using various mobile drive units 20 to transport inventory holders 30 and 34 to inventory stations 56. After an order is received, management module 15 may determine the type and/or temperature class of inventory items being requested. For example, management module 15 may determine that an order includes a request for an ambient inventory item 32, a cool inventory item 36, and a frozen inventory item 38. Management module 15 may attempt to locate the ambient inventory item 32 within ambient inventory holders 30 and the cool inventory item 36 and frozen inventory item 38 within inventory holders 34. Based on determining that a particular ambient inventory holder 30 stores the requested ambient inventory item 32, management module 15 may select inventory holder 30 to be transported to inventory station 56. Likewise, based on determining that a particular climate-controlled inventory holder 34 stores a particular cool inventory item 36 or frozen inventory item 38, management module 15 may select that inventory holder 34 to be transported to inventory station 56. In the case where more than one inventory holder 30 and/or inventory holder 34 store the requested inventory item, management module may select an inventory holder 30 and/or 34 based on the more efficient use of system resources. For example, management module 15 may select the inventory holder 30 and/or 34 based on distance from inventory station 56 and/or based on determining that the particular inventory holder 30 and/or 34 stores inventory items requested by multiple orders. As another example, for climate-controlled inventory holders 34, management module 15 may select the inventory holder 34 that is calculated to be away from a source of electric power and/or refrigeration for a lower amount of time.

Management module 15 may select mobile drive unit 20 to transport each selected inventory holder 30 and/or 34 to inventory station 56. That selection may also be based on various factors, including the proximity of mobile drive unit 20 to a particular selected inventory holder 30 and/or 34. The selection may also be based on an assignment state and/or capability state of particular mobile drive units. For example, management module 15 may select a mobile drive unit 20 that is not currently assigned a task over a mobile drive unit 20 that is currently completing an assigned task. As another example, management module 15 may select a mobile drive unit 20 that has a higher level of fuel and/or is currently capable of completing the task without needing refueling or other maintenance. Management module 15 may then transmit appropriate instructions and/or task assignments to the selected mobile drive units 20.

Management module 15 may select, from available inventory stations 56, a particular inventory station 56 to fulfill that order. The selection may be based on various factors such as determining that a particular inventory station 56 is designated for fulfilling the type of inventory on that order. For example, management module 15 may select an inventory station 56 that is designated for fulfilling orders for ambient inventory items 32 to fulfill an order for an ambient inventory item 32. As another example, management module 15 may select an inventory station 56 that is designated for fulfilling orders for cool inventory items 36 and/or frozen inventory items 38 to fulfill an order for an cool inventory items 36 and/or frozen inventory items 38. Management module 15 may, in some embodiments, select an inventory station 56 capable of filling orders for ambient inventory items 32, cool inventory items 36, and frozen inventory items 38, or any combination thereof. In some embodiments, inventory stations 56 designated for cool inventory items 36 and/or frozen inventory items 38 may be capable of also processing ambient inventory items 32. For example, management module 15 may select such a station to process orders that include both inventory items 36 or 38 and inventory items 32. In addition or in the alternative, the selection may be based on workload and/or waiting times of various inventory stations 56. For example, for climate-controlled inventory holders 234 and/or 434, management module 15 may select an inventory station 56 with a lower wait time than another inventory station 56 in order to reduce the time required to return those inventory holders 234 and/or 434 to a refrigeration and/or power source for onboard refrigeration unit 338.

Mobile drive units 20 may then move to the selected inventory holder 30 and 34 according to instructions received from the management module 15. The selected inventory holder 30 or 34 may, for example, be located in one of storage areas 78. Once at the location of a particular inventory holder 30 or 34, mobile drive unit 20 may dock, lift, couple, or otherwise connect to inventory holder 30 or 34. Mobile drive unit 20 may then transport the respective inventory holders 30 or 34 to the selected inventory stations 56.

Management module 15 may also select appropriate containers 42, 44, and 46 to be included in container holder 40 to hold orders for inventory items. Management module may facilitate placement of appropriate containers on container holder 40 at induction station 54. For example, management module 15 may instruct operators at induction stations 54 which containers and what quantities of those containers to place on a particular container holder 40. Management module 15 may select a mobile drive unit 20 to transport container holder 40 to inventory station 56 from induction station 54. Management module 15 may then issue appropriate instructions and/or task assignments to the selected mobile drive units 20. After mobile drive units 20 receive appropriate instructions and/or task assignments, Container holders 40, containing appropriate containers 42, 44 and/or 46 may be transported by mobile drive units 20 to inventory station 56.

At inventory stations 56, the requested inventory items 32, 36, and 38 may be removed from their respective inventory holders 30 and 34 and placed into an appropriate container 42, 44, or 46. For example, a worker or operator of inventory station 56 may remove an ambient inventory item 32 from inventory holder 30 and place the item into container 42. As another example, a worker or operator of inventory station 56 may remove an cool inventory item 36 from inventory holder 34 and place the item into container 44. As another example, a worker or operator of inventory station 56 may remove an frozen inventory item 38 from inventory holder 34 and place the item into container 46. For stations capable of processing inventory items 32 and inventory items 36 and 38, a container 44 or 46 may be selected by management module 15 that is appropriate for shipping inventory items 36 or 38. Inventory items 32 that are capable of being stored at a broad range of temperatures may be placed into containers 44 and/or 46 along with the cool or frozen inventory items 36, 38. Management module 15 may choose to group inventory items 32 along with cool and/or frozen inventory items 36, 38 into containers 44, 46 in order to reduce the number of containers utilized for orders for various types of items.

As inventory used by inventory system 10 to fill various orders, additional replacement and/or replenishment inventory may be received at various times at receiving stations 52, including additional ambient inventory items 32, cool inventory items 36, and/or frozen inventory items 38. Management module 15 may select appropriate inventory holders 30 and/or 34 to receive inventory items 32, 36, and/or 38, such as inventory holders 30 and/or 34 that are low and/or depleted of those items and/or that are designated to receive those types of items. Management module 15 may accordingly issue instructions to mobile drive units 20 to transport inventory holders 30 and/or 34 that are low and/or depleted of their inventory items to receiving stations 52 to receive replenishment inventory. Management module 15 may use similar prioritization techniques when replenishing inventory at receiving stations 52 as is discussed herein with respect to filling orders at inventory stations 56.

Management module 15 may take into account various factors related to the temperature characteristics of particular inventory items and/or inventory holders when coordinating and managing various task assignments. These factors may affect management module 15's decision making process when selecting inventory holders and/or instructing mobile drive units 20 to move inventory holders to inventory stations 56. For example, in embodiments where inventory holders 234 and 434 are disconnected from refrigeration in transport, management module 15 may prioritize transportation of inventory items 36 and/or 38 stored in those inventory holders over orders for ambient inventory items 32. In some embodiments, management module 15 may prioritize transportation of inventory items 36 and/or 38 stored in those inventory holders over orders for ambient inventory items 32 based on determining that temperature information received from temperature sensor 202 has reached a predetermined threshold. For example, management module 15 may determine that the internal temperature of a particular inventory holder 234 or 434 has gotten too warm and that inventory holder should returned to refrigeration in an expedited manner. Thus, management module 15 may determine to fulfill orders for cool inventory items 36 and/or 38 before fulfilling orders for inventory items 32 based on relative priorities of those items. Management module 15 may be capable of adjusting the priority of cool inventory items 36 and/or 38 based on the amount of time those inventory items 36 and/or 38 have been disconnected from refrigeration (for example, a power source and/or a source of refrigerated air). For example, once the amount of time has passed some predetermined threshold, management module 15 may increase the priority of those items above other inventory items 32, 36, or 38. Alternatively or additionally, management module 15 may, based on received temperature information for a particular inventory holder 34, also modify priority of particular inventory items 36 and/or 38. For example, management module 15 may increase the priority of inventory items that are stored in climate-controlled inventory holders 234 or 434 disconnected from refrigeration and/or where the internal temperature of those holders has passed some predetermined threshold. Based on the increased priority, management module 15 may issue instructions to fulfill the orders for those inventory items 36 and/or 38 from that inventory holder 34 before fulfilling orders for other inventory items 32, 36, or 38. In some embodiments, management module 15 may be capable of providing similar prioritization for replenishing inventory holders 34 at receiving stations 52.

Management module 15 may also be capable of removing particular inventory holders 30 and/or 34 from a queue or waiting area associated with particular inventory stations 56 based on determining to fill an order for a higher priority item. Management module 15 may also be capable of reordering the queue based on prioritization. In some embodiments, lower priority inventory holders 30 that destined for a particular inventory station 56 and/or are in a queue may be instructed to move to a drift location or different place in the queue before proceeding and/or returning to inventory station 56. More specific details on prioritizing cool inventory items 36 or frozen inventory items 38 and for utilizing drift locations to enforce order priorities are discussed below with respect to FIGS. 6-8.

Figure 6:
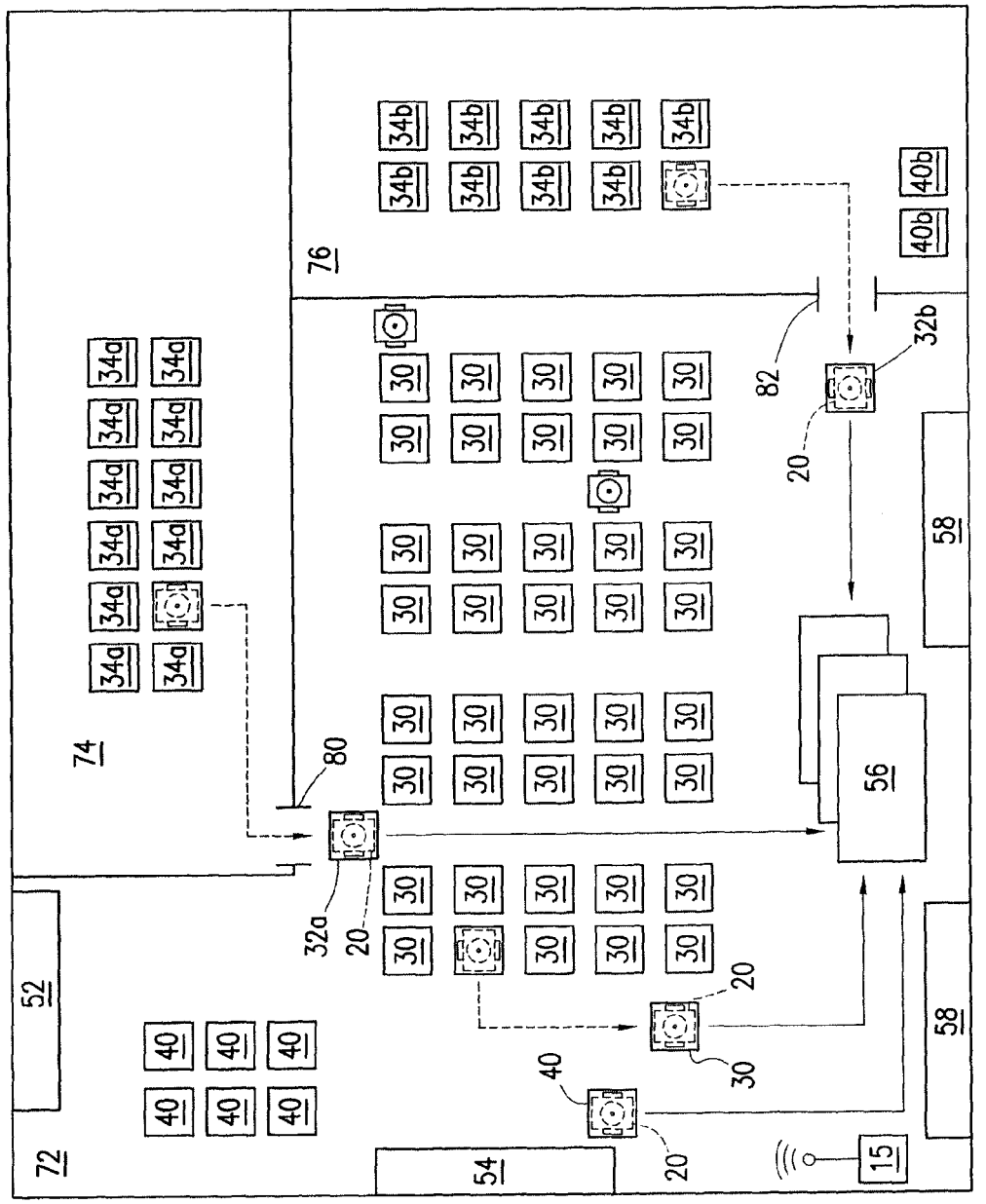
FIG. 6 is a block diagram of an example embodiment of an inventory system with climate-controlled inventory.

FIG. 6 is a block diagram of an example embodiment of an inventory system 10 with climate-controlled inventory. Inventory system 10 of FIG. 6 may include similar components as explained above with respect to FIGS. 1-5. In addition, inventory system 10 includes various temperature zones 72, 74 and 76 within workspace 70. Ambient temperature zone 72 may be at an ambient or room-temperature, cool temperature zone 74 may be at a cool temperature, and freezing temperature zone 74 may be at a freezing temperature. For example, inventory system 10 may represent an online grocer's distribution facility, and zones 74 and 76 may respectively represent coolers and freezers that store cool inventory items 36 and frozen inventory items 38. Temperature zones 74 and 76 may respectively include entrances 80 and 82. In general, mobile drive units 20 are operable to enter zones 74 and 76 to retrieve inventory holders 34a and 34b in response to instructions from management module 15. Inventory holders 34a and 34b may respectively represent inventory holders 34 that are designated for storing cool inventory items 36 and frozen inventory items 38.

Temperature zone 72 may be a temperature zone kept at an ambient or room temperature. For example, temperature zone 72 may represent a commonly accessible area of workspace 70, which is described above with respect to FIG. 5. Temperature zone 74 may be a temperature zone kept at below-room temperature. For example, temperature zone 74 may represent a walk-in refrigerator or cooler that holds the environment within the zone at a temperature appropriate for storing cool inventory items 36. Temperature zone 76 may be a temperature zone kept at a frozen temperature. For example, temperature zone 76 may represent a walk-in refrigerator or freezer that holds the environment within the zone at a temperature appropriate for storing frozen inventory items 38. One or more various barriers or walls may separate the various zones in order to maintain the respective temperatures within the interior of those zones and/or prevent or inhibit air flow from the respective zones.

Entrances 80 and 82 represent any appropriate openings, doors, devices, and other appropriate components to facilitate entering and exiting respectively from temperature zones 74 and 76. In some embodiments, entrances 80 and 82 may include one or more actuating doors, gates, or other movable barrier operable to open and close entrance 80. The doors may include an appropriate device that may be actuated by mobile drive units 20, thus allowing mobile drive units to automatically pass in and out of zones 74 and 76 at appropriate times. For example, entrance 80 may include a pressure sensor, photo detector, lever, button, or other suitable device that may respond to the presence of mobile drive unit 20. In some embodiments, entrance 80 may include appropriate electronics, receivers, and/or transceivers to receive an electronic signal transmitted by mobile drive units 20. The electronic signal may instruct entrance 80 to open its one or more doors or gates. In response to receiving an appropriate electronic signal, entrance 80 may open so that mobile drive unit 20 may enter or exit. While discussed as having actuating doors, the entrances 80 and 82 may be any appropriate means of allowing access to zones 72 and 74 while generally impeding air flow. For example, entrances 80 and 82 may additionally or alternatively include insulated strip curtains that hang from the top frame of the opening. Mobile drive units 20 may enter and exit by moving through the strip curtains. As another example, in some embodiments, entrance 80 may include a spring-actuated door that mobile drive unit 20 may simply push open using force generated by its motorized wheels.

As illustrated, inventory holders 34a are disposed within temperature zone 74 and inventory holders 34b are disposed within temperature zone 76. Because inventory holders 34a and 34b are located within zones that are themselves climate-controlled, the inventory holders 34 may not necessarily include any means of individually cooling each inventory holder. In some embodiments, inventory holders 34 may include insulation material, such as insulated strip curtains around the outer portion of the inventory holder 34. Accordingly, when inventory holders 34 are removed from the respective temperature zones 74 or 76, inventory holders 34 may be at least partially insulated from the ambient temperatures within temperature zone 72. In some embodiments, container holders 40, such as container holders 40b, storing containers 44 or 46 may be stored as appropriate in one or more of temperature zones 74 or 77. For example, containers 44 or 46 that include chill packs, dry ice, or other chilled materials may be stored in the appropriate climate-controlled zone 74 or 76.

In operation, as explained above, management module 15 receives various orders for inventory items 32, 36 and 38 and issues instructions to mobile drive units 20 to retrieve those inventory holders and transport them to inventory stations 54. Management module 15 prioritizes cool inventory items 36 and frozen inventory items 38. For example, management module 15 may determine a temperature class of the inventory items on a particular order. In some embodiments, temperature class may be determined based on a location at which the inventory items are stored and/or may be predetermined based on information associated with a SKU or other identifier of inventory items. Based on the temperature class, management module 15 may assign priorities to various orders, inventory holders, inventory items, and/or instructions issued to the various mobile drive units 20. For example, a task to transport an inventory holder 30 within temperature zone 72 may be assigned one priority, while another task to transport inventory holder 34 from zones 72 or 74 may be assigned another priority. In some embodiments, instructions and/or task assignments to transport inventory holders 30, 34a, and 34b may each be assigned a respective priority. For example, instructions to transport inventory holders 34b storing requested frozen inventory items 38 may have higher priority than instructions to transport inventory holders 34a storing requested cool inventory items 36. Both instructions may be assigned higher priorities than instructions to transport inventory holders 30 storing ambient inventory items 32. In some embodiments, management module 15 may assign, set, modify, and/or adjust the priority of inventory holders 34 based on the length of time inventory holder 34 has been away from its respective zone 74 or 76. Inventory holder 34 may also include a temperature sensor and management module 15 may assign, set, modify, and/or adjust priorities based on temperature information received from the temperature sensor of inventory holder 34.

Based on the assigned priorities, management module 15 may determine a sequence in which inventory holders 30, 34a, and 34b should be transported to inventory station 56. For example, management module 15 may determine to fill orders for higher priority inventory items first, followed sequentially by lower priority inventory items. In some embodiments, management module 15 may be capable of scheduling the transportation of inventory holders 30 and 34 in order to minimize or reduce an amount of time that each inventory holder 34 is away from its respective zone 74 or 76. For example, after receiving an order for cool inventory items 36 or frozen inventory items 38, management module 15 may determine whether locations are available at inventory station 56 to fill the order. If there are no available locations, management module 15 may determine that an earlier received order for an ambient inventory item 32 is in the process of being fulfilled at inventory station 56 by inventory holder 30. Management module 15 may estimate the time remaining before the order is filled and/or inventory holder 30 leaves inventory station 56. In response to determining that the time required to fulfill that order would be greater than an acceptable predetermined threshold, management module 15 may determine to schedule transportation of inventory holder 34 to inventory station 56 at a later time at which fulfillment time would be within the threshold. The predetermined threshold may be calculated to match an acceptable time period for which inventory holder 34a or 34b may be away from their respective temperature zones without the inventory items stored by those holders reaching temperatures that would cause melting, spoliation, or ruin. For example, management module 15 may calculate that that a maximum acceptable time period away from a cooler or freezer is two to five minutes. In some embodiments, management module 15 may schedule transportation for after the estimated time remaining reaches the acceptable predetermined threshold. Then, management module 15 may instruct mobile drive unit 20 to transport inventory holder 34 to inventory station 56.

Management module 15 may use various techniques to facilitate enforcement of priorities. For example, inventory station 56 may have a number of locations available at which inventory holders 30 and/or 34 may be moved to so that inventory items 32, 36, or 38 may be received. In some embodiments, if there are not available locations at inventory station 56, management module 15 may determine to remove another inventory holder 30 or 34 from one of the occupied locations and replace that inventory holder with a higher priority inventory holder, such as one of inventory holders 34a or 34b. In order to facilitate this capability, management module 15 may be capable of using a technique called drifting. Drifting facilitates the movement of ambient inventory holders 30 and temperature-controlled inventory holders 34 to inventory station 56 in a timely and efficient manner. Management module 15 may, for example, instruct an inventory holder 30 and/or 34 to be removed from a location at inventory station 56 to move to a drift location in the vicinity of inventory station 56. That inventory holder may remain there until a trigger event occurs, such as a location becoming available at inventory station 56. As another example, management module may determine to issue modified instructions to a mobile drive unit 20 that are en route to inventory station 56 to instead move to a drift location before proceeding to inventory station 56. Additionally or alternatively, management module 15 may, based, for example, on overall system activity levels, determine to send inventory holders with lower priority inventory items, orders, and/or line item requests to drift locations while higher priority inventory items, orders, and/or line item requests for cool inventory items 36 and frozen inventory items 38 are filled. More details of these techniques will be discussed below with respect to FIG. 7.

In some embodiments, inventory station 56 may have a queue associated with it, in which inventory holders 30 and/or 34 wait in the order in which they are scheduled to arrive at inventory station 56. Management module 15 may, based on priorities, change the order of the queue and/or remove particular inventory holders 30 and/or 34 from the queue to replace those holders with higher priority inventory holders 34. For example, management module 15 may determine for inventory holder 34 storing a cool inventory item 36 to take the place in the queue of inventory holder 30 storing an ambient inventory item 32 based on determining that the priority of inventory holder 34 is higher than inventory holder 30. Additionally or alternatively, the determination may be based on the type of inventory item in each inventory holder and/or the refrigeration capabilities, temperature, or other temperature characteristics of the inventory holder. Accordingly, management module 15 may instruct mobile drive unit 20 carrying inventory holder 30 to move from its queue location and for another mobile drive unit 20 carrying inventory holder 34 to take its place. Management module 15 may instruct mobile drive unit 20 to move inventory holder to another location, such as a lower queue location and/or a drift location. Management module 15 may make similar determinations and provide similar instructions based on determining that inventory holder 34 storing frozen inventory items 38 has a higher priority than an inventory holder 30 storing ambient inventory items 32 and/or an inventory holder 34 storing cool inventory items 36. If the queue includes multiple inventory holders 30 and/or 34 management module 15 may select the inventory holder 30 and/or 34 that has the lowest priority of the holders in the queue for replacement or reordering. Thus, the management module 15 may coordinate the order in which inventory holders are arranged in the queue so that the queue may generally be in order from higher priority at the front of the queue to lower priority at the back of the queue.

Figure 7:
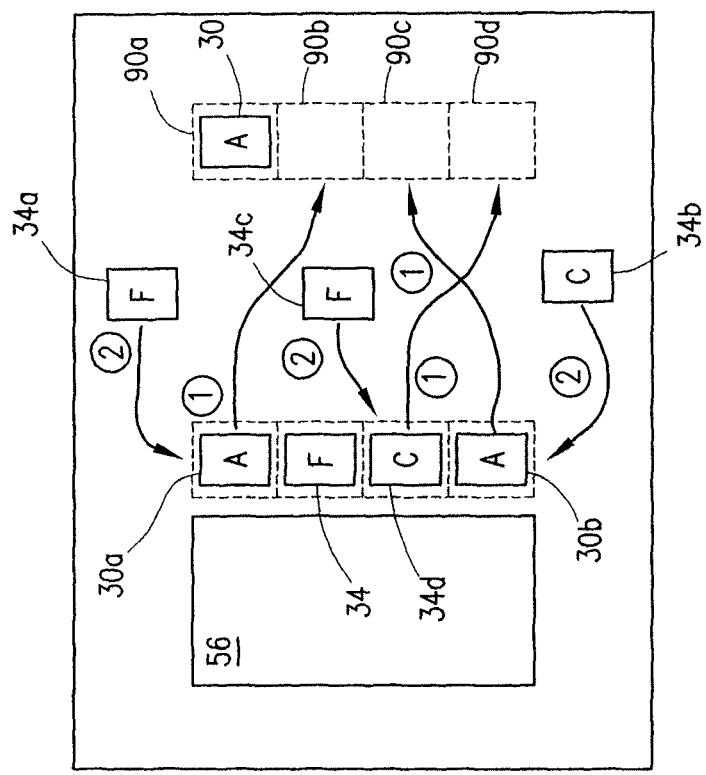
FIG. 7 is a block diagram illustrating example techniques for prioritizing requests for climate-controlled inventory.

FIG. 7 is a block diagram illustrating example techniques for prioritizing requests for climate-controlled inventory in a climate-controlled inventory system 10. Inventory system 10 may include one or more drift locations 90A to 90D and one or more locations at and/or leading to inventory station 56. For example, those locations may represent a queue to inventory station 56. Management module 15 may be operable to designate particular areas within inventory system 10 as drift locations 90. Accordingly, management module 15 may use one or more drift locations 90 in conjunction with inventory station 56 to facilitate fulfillment of orders and enforcement of priorities, which may be based on temperature characteristics of inventory items.

Inventory system 10 may facilitate fulfillment of orders at inventory station 56 utilizing a technique herein referred to as "drifting." Drifting may allow components of inventory system 10, during the completion of a particular task involving that element, to move towards a particular destination or otherwise be positioned so as to reduce a travel time to the relevant destination. In the context of facilitating the fulfillment of orders at inventory station 56, drifting may be used to gather inventory items 32, 36 or 38 to the vicinity of inventory station 56 such that they are nearby when locations and/or queue spaces at inventory station 56 become available. The inventory items 32, 36 or 38 that are drifting may be expected to be needed to fill or more orders in the near future. Thus, the time required to swap out and/or replace inventory items 42 stationed at inventory pier 50 may be reduced over less sophisticated techniques.

"Drift" locations 90 represent locations in the vicinity of inventory station 56 in the warehouse designated for a mobile drive unit 20 carrying an inventory holder 30 or 34 to "drift" until the appropriate time. Drift locations 90 may be used as locations where lower priority inventory holders and/or inventory items may wait until resources at inventory station 56 become available. Drift locations 90 may, for example, be utilized to keep inventory holder 30 in the vicinity of inventory station 56 that while inventory holders 34 may be transported to inventory station 56. These techniques may be particularly beneficial for inventory holders 34 that are not refrigerated while being transported to inventory station 56, such as inventory holders 234, 434, and inventory holders stored in zones 74 and 76. Some embodiments of system 10 may utilize drifting to anticipate tasks to be completed and to position the relevant components so as to reduce the time required to complete the anticipated tasks. Drifting may facilitate completion of orders based on priorities while reducing congestion caused by using less sophisticated techniques. Utilization of drift locations 90 may allow for fulfillment of a particular order that involves the completion of several tasks by inventory system 10 while reducing the time that inventory system 10 spends completing such tasks and improving system throughput. Drifting may additionally or alternatively allow for more efficient use of the finite physical area available within inventory system 10. An example embodiment of inventory system 10 including drift locations 90 is herein described.

Management module 15 may determine to send a particular inventory holder 30 and/or inventory holder 34 to a particular drift location 90 in response to detecting a first trigger event (or events). In particular embodiments, the relevant element may remain in the particular drift location 90 or a particular group of drift locations 90 until a second trigger event (or events) occurs. After the second trigger event occurs, the element may then move toward the relevant system resource for completion of the task. In particular embodiments, spaces may be statically designated as drift locations 90, while in alternative embodiments, spaces may be dynamically designated as drift locations 90 depending on the resource needs of inventory system 10, the availability of locations at inventory stations 56, and/or other appropriate considerations. As described further below, drift locations 90 may be utilized in various ways to improve throughput or otherwise increase system efficiency of certain embodiments of inventory system 10, including but not limited to facilitating fulfillment of orders at inventory station 56.

Management module 15 may determine to move an inventory holder 30 away from inventory station 56 in response to a first trigger event such as determining that completion and/or processing of a particular order or inventory item has a higher priority than the inventory holder 30. For example, as illustrated, inventory holder 34a storing frozen inventory items 38 (indicated by an "F") is determined to have higher priority than an inventory holder 30 storing ambient inventory items 32 (indicated by an "A"). Accordingly, inventory holder 30 is first removed from one of the locations at inventory station 56 and moved to drift location 90b. Inventory holder 30a remains in drift location 90b until a second trigger event occurs, which may be detecting that a location at inventory station 56 is available. For instance, inventory holder 34a may leave inventory station 56 after requested frozen inventory items 38 are received and vacate a location at inventory station 56. In some embodiments, management module 15 may modify the priority of inventory holder 30a over time based on time that inventory holder 30a waits and/or the time pending for the order corresponding to the inventory items 32 stored in inventory holder 30a. Thus, inventory holder 30a may be assigned and/or obtain priority over another inventory holder 30 that holds ambient inventory items 32 corresponding to a relatively more recent order. In some embodiments, when the time waiting for the order to complete corresponding to inventory holder 30a passes some predetermined threshold, management module 15 may determine to schedule transportation of another inventory holder 34 and/or 30 at a later time rather than have inventory holder 30a continue to wait.

As another example, inventory holder 34b storing cool inventory items 36 (indicated by a "C") have higher priority than inventory holder 30b storing ambient inventory items 32 (indicated by an "A"). Thus, inventory holder 30b may be replaced at inventory station 56 by inventory holder 34b in a similar manner as was discussed above with respect to inventory holder 30a.

As another example, inventory holder 34c storing frozen inventory items 38 (indicated by an "F") may have higher priority than another inventory holder 34d storing other cool inventory items 36. Thus, inventory holder 34c may be replaced at inventory station 56 by inventory holder 34d in a similar manner as was discussed above with respect to inventory holder 30a.

It should be noted that while illustrated examples in FIG. 7 depict replacing various inventory holders that are located at inventory station 56, management module 15 may determine to drift various inventory holders 30 and/or 34 before being sent to inventory station 56 and/or while in transit to inventory station 56. Management module 15 may utilize similar techniques to replace and/or reorder inventory holders 30 and 34 in a queue to inventory station 56.

FIG. 8 is a flowchart illustrating an example method 800 for fulfilling an order for ambient inventory items 32 and climate-controlled inventory items 36 and 38. At step 802, one or more orders are received by management module 15 for inventory items 32, 36, or 38. Management module 15 may, at step 804, determine in which inventory holders 30 and/or 34 that the requested inventory items 32, 36, or 38 on the orders are located. Management module 15 may select first inventory holders 30 and/or 34 holding the requested items for transportation to inventory stations 56.

At step 806, management module 15 may assign initial priorities to completion of the orders and/or completion of the various lines on the orders. Each line of an order may represent, for example, a quantity of a unique inventory item 32, 36, or 38 requested by the order. Management module 15 may assign initial priorities, for example, based on determining the temperature classes of the inventory items and/or the refrigeration capabilities of the inventory holders 34 storing the items. For example, an inventory holder 30 storing ambient inventory items 32 may be assigned a first priority, an inventory holder 34 storing cool inventory items 36 may be assigned a second priority, and another inventory holder 34 storing frozen inventory items 36 may be assigned a third priority. The third priority may be higher than the second priority, and the second priority may be higher than the first priority. The priorities may be set based on temperature characteristics of the various inventory items in the respective inventory holders. For example, inventory holders 34 storing frozen inventory items 38 may be assigned a higher priority than inventory holders 34 storing cool inventory items 36, which may be assigned a higher priority than inventory holders 30 storing ambient inventory items 32. In some embodiments, management module 15 may determine a sequence in which inventory holders 30 and 34 are to be transported to inventory stations 56. The determination may be based on the assigned priorities of the various inventory holders 30 and/or 34. For example, management module 15 may, based on assigned priorities, set the sequence to be inventory holder 34 storing the frozen inventory items 38 first, followed by inventory holder 34 storing the cool inventory items 36, followed by inventory holder 30 storing ambient inventory items 32. In some embodiments, management module 15 may additionally or alternatively set a schedule by which those inventory holders are to be transported to inventory stations 56. The schedule may be calculated to reduce and/or minimize the amount of time that inventory holders 34 storing cool inventory items 36 and inventory holders 34 storing frozen inventory items 38 are away from their respective temperature zones 74 and/or 76. Alternatively or in addition, the schedule may be calculated to reduce and/or minimize the amount of time that inventory holders 34 storing cool inventory items 36 and inventory holders 34 storing frozen inventory items 38 are disconnected from refrigeration, such as inventory holders 234 and/or 434.

At step 808, management module 15 may select one or more mobile drive units to retrieve those inventory holders selected in step 804. At step 810, management module 15 may instruct and/or issue task assignments to one or more mobile drive units 20 to retrieve those inventory holders and to transport them to one or more inventory stations 56. In some embodiments, management module 15 may assign priorities to the instructions to the mobile drive units that correspond to the priorities assigned to the inventory holders 30 and/or 34. Using the example discussed above, instructions and/or first task assignments to transport inventory holder 30 storing ambient inventory items 32 may be assigned a first priority, instructions and/or first task assignments an inventory holder 34 storing cool inventory items 36 may be assigned a second priority, and instructions and/or first task assignments another inventory holder 34 storing frozen inventory items 36 may be assigned a third priority. The relative priorities may be similar to those discussed above.

At step 812, management module 15 may determine whether first locations are available at inventory station 56. For example, management module 15 may determine whether any first locations are occupied at inventory station 56. For example, first locations may include locations at inventory station 56 and/or queue spaces associated with inventory station 56. In some embodiments, a queue may be associated with inventory station 56 and management module may determine whether there are any available queue spaces.

Inventory holders 30 and/or 34 may wait in the queue while orders are filled at inventory station 56 by other inventory holders 30 and/or 34.

If at step 812 there are no available locations because, for example, there are second inventory holders 30 and/or 34 occupying the locations at inventory stations 56, method 800 may proceed to step 814. In some embodiments, method 800 may proceed to step 814 if there are second inventory holders 30 and/or 34 in queue to inventory station 56. At step 814, the priorities of second inventory holders 30 and/or 34 may be compared to the first inventory holders 30 and/or 34. Management module 15 may determine whether any priorities assigned to the first inventory holders 30 and/or 34 are higher than any priorities assigned to the second inventory holders 30 and/or 34. For example, management module 15 may determine that one of second inventory holders 34 storing cool inventory items 36 and/or frozen inventory items 38 is assigned a higher priority than one of first inventory holders 30 storing ambient inventory items 32.

If there are second inventory holders 30 or 34 in the first locations that have lower priority, then at step 816, management module 15 may select one or more of the first inventory holders 30 and/or 34 to move away from the first locations to second locations. If, for example, there are multiple first inventory holders 30 and/or 34 with lower priority than one of second inventory holders 30 and/or 34, management module 15 may select the one of the multiple first inventory holders 30 with lower priority to move to a second location.

At step 818, management module 15 may instruct one or more mobile drive units to transport the second inventory holders 30 and/or 34 to second locations. Second locations may, for example, represent a different and/or lower queue space. Second locations may also, in some embodiments represent one or more drift locations. Those second inventory holders 30 and/or 34 moved to second locations may wait at those locations until a trigger event occurs, such as a location at inventory station 56 and/or a queue space becoming available. In some embodiments, management module 15 may after predetermined amounts of time increase the priority of waiting inventory holders 30 and/or 34 based on the amount of time those inventory holders have been waiting. Those inventory holders 30 and/or 34 may thus gradually increase in priority as appropriate to ensure that they will have the priority to eventually be selected for movement to inventory station 56. This may facilitate preventing stranding and/or starving inventory holders 30 that might otherwise continually be passed over by higher priority inventory holders 34.

After the second inventory holders 30 and/or 34 are moved to second locations, management module 15 may at step 820 instruct mobile drive units 20 to proceed with the first inventory holders 30 and/or 34 to inventory station 56. In some embodiments, the first inventory holders 30 and/or 34 may first be placed into one of the queue spaces behind other inventory holders 30 and/or 34 that have higher priorities. Once at inventory station 56, orders for inventory items and/or lines of orders for inventory items stored by those holders may be completed at step 824.

If at step 824, the first inventory holders 30 and/or 34 do not have higher priority than any of the second inventory holders 30 and/or 34 in the first locations, management module 15 may instruct mobile drive units 20 to transport the first inventory holders 30 and/or 34 to the second locations. For example, mobile drive units 20 may be instructed to transport first inventory holders 30 and/or 34 to one or more drift locations. Alternatively or in addition, management module 15 may instead allow first inventory holders 30 and/or 34 to remain in storage locations 68 and/or zones 72, 74 and/or 76 while the higher priority orders from second inventory holders 30 and/or 34 are completed. For example, management module 15 may assign a higher priority on inventory holders 34 storing frozen inventory items 38 that have left zone 76 and/or are disconnected from refrigeration than inventory holders 34 storing frozen inventory items 38 that are still in zone 76 and/or are connected to refrigeration. As another example, management module 15 may assign a higher priority to completing an earlier order for ambient inventory items 32 that is in the process of being filled over a later order for cool inventory items 36 and/or frozen inventory items 38 where those items are still being refrigerated. Thus, management module 15 may schedule transportation of those inventory items for a later time and/or after the earlier order has been completed.

At step 826, secondary inventory holders 30 and/or 34 wait for a trigger event to occur. For example, a queue space higher in the queue may become available and/or a location at inventory station 56 may become available. At 828, any appropriate trigger event may be detected, including any of the events discussed above with respect to step 818. Once the trigger event is detected by management module 15 at step 828, the method may proceed to step 820, where mobile drive units 20 are instructed to proceed with the first inventory holders 30 and/or 34 to inventory station 56, as explained above.

In some embodiments, management module 15 may modify assigned priorities based on various factors. For example, management module 15 may increase an assigned priority of an inventory holder 34 that is disconnected from refrigeration. For example, inventory holder 34 may be away from zone 74 or 76. Management module 15 may similarly increase an assigned priority of an inventory holder 34 such as inventory holder 234 that has been disconnected from outlet vent 204 or inventory holder 434 that has been disconnected from a power source. For such inventory holders 34, management module 15 may similarly increase assigned priorities based on time away from refrigeration and/or time exposed to ambient and/or room temperatures. For embodiments of inventory holder 434 capable of running on battery power, management module 15 may increase priority based on inventory holder 434 being on battery power and/or based on a battery charge level falling below a predetermined threshold. Additionally or alternatively, management module 15 may modify assigned priorities based on temperatures received from temperature sensors 202 while inventory holders 34 are in transport.

Modifications, additions, or omissions may be made to method 800 illustrated in the flowcharts of FIG. 8. For example, management module 15 may be capable of assigning many tasks at once and/or in parallel. Thus, management module 15 may also process many orders in parallel and/or in sequence. Moreover, management module 15 may be capable of fulfilling orders for any number and types of inventory facilities. Orders corresponding to various of those facilities may be processed by management module 15 sequentially and/or at the same time using various inventory stations 56. Additionally, the steps of FIG. 8 may be performed in parallel or in any suitable order. Moreover, the embodiments described with respect to the of the present disclosure are expected be fully combinable and suitable for use in appropriate embodiments described herein.

Figure 9:
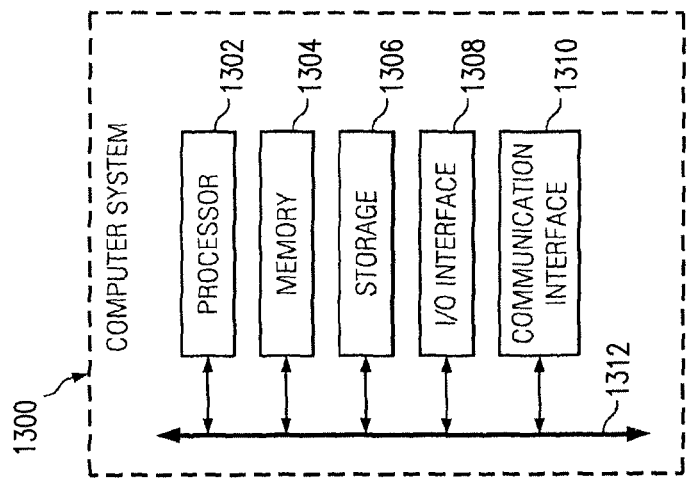
FIG. 9 is a block diagram illustrating an example computer system that may be used for one or more portions of the systems and method disclosed herein.

FIG. 9 is a block diagram illustrating an example computer system 1300 that may be used for one or more portions of the systems and method disclosed herein. In particular embodiments, one or more computer systems 1300 perform one or more steps of one or more methods described or illustrated herein. In particular embodiments, one or more computer systems 1300 provide functionality described or illustrated herein, such as, for example, any appropriate component of system 10, such as management module 15 and/or mobile drive unit 20. In particular embodiments, software running on one or more computer systems 1300 performs one or more steps of one or more methods described or illustrated herein or provides functionality described or illustrated herein. Particular embodiments include one or more portions of one or more computer systems 1300.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple datacenters; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. Although this disclosure describes and illustrates a particular processor, this disclosure contemplates any suitable processor.

In particular embodiments, memory 1304 includes main memory for storing instructions for processor 1302 to execute or data for processor 1302 to operate on. In certain embodiments, memory 1304 may be memory includes in any of the system 10 components discussed above, such as management module 15 and/or mobile drive units 20. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. Although this disclosure describes and illustrates particular memory, this disclosure contemplates any suitable memory.

In particular embodiments, storage 1306 includes mass storage for data or instructions. In certain embodiments, storage 1306 may be included in any appropriate component of system 10, including management module 15 and/or mobile drive units 20. Storage 1306 may include removable or non-removable (i.e., fixed) media, where appropriate. Storage 1306 may be internal or external to computer system 1300, where appropriate. In particular embodiments, storage 1306 is non-volatile, solid-state memory. Where appropriate, storage 1306 may include one or more storages 1006. Although this disclosure describes and illustrates particular storage, this disclosure contemplates any suitable storage.

In particular embodiments, I/O interface 1308 includes hardware, software, or both providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 1310 for it. Although this disclosure describes and illustrates a particular communication interface, this disclosure contemplates any suitable communication interface.

In particular embodiments, bus 1312 includes hardware, software, or both coupling components of computer system 1300 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1302 (such as, for example, one or more internal registers or caches), one or more portions of memory 1304, one or more portions of storage 1306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While particular embodiments of inventory system 10 are illustrated, it should be appreciated that the teaching of the present disclosure may be applied to any type and number of inventory systems. For example, inventory system 10 may represent a merchandise-return facility. In such an embodiment, inventory items may represent merchandise returned by customers. Units of these inventory items may be stored in inventory holders 30 when received at the facility. At appropriate times, a large number of units may be removed from a particular inventory holder 30 and packed for shipment back to a warehouse or other facility.

As yet another example, inventory system 10 may represent a manufacturing facility with inventory items 32 representing individual components of a manufacturing kit to be included in an assembled product, such as electronic components for a customized computer system. In such an embodiment, inventory system 10 may retrieve particular components identified by a specification associated with an order for the product so that a customized version of the product can be built. Although a number of example embodiments are described, inventory system 10 may, in general, represent any suitable facility or system for storing and processing inventory items. Similarly, inventory items 32 may represent objects of any type suitable for storage, retrieval, and/or processing in a particular inventory system 10.

Additionally, management module 15 may represent a single component, multiple components located at a central location within inventory system 10, and/or multiple components distributed throughout inventory system 10. For example, management module 15 may represent components of one or more mobile drive units 20 that are capable of communicating information between the mobile drive units 20 and coordinating movement of mobile drive units 20 in transporting inventory holders 30. In general, management module 15 may include any appropriate combination of hardware and/or software suitable to provide the described functionality and may further include components located on mobile drive units 20, stations 50, or other elements of inventory system 10.

Furthermore, as noted above, management module 15 may include components of individual mobile drive units 20.

Thus, for the purposes of this description, communication between management module 15 and a particular mobile drive unit 20 may represent communication between components of a particular mobile drive unit 20. In general, mobile drive units 20 may be powered, controlled, and propelled in any manner appropriate based on the configuration and characteristics of inventory system 10.

Moreover, while the present disclosure discusses specific examples of container holders 40, any appropriate number and types of container holders 40 may be used. For example, container holders 40 may be substantially similar or identical to inventory holders 30. For example, inventory system 10 may include general-purpose holders that can be used as both inventory holders 30 and container holders 40. Inventory system 10 may include a number of general-purpose holders that may be dynamically designated as an inventory holder 30 or a container holder 40 depending on whether inventory items 32 or containers 42 are stored on the relevant holder at that particular time. Moreover, in particular embodiments, holders may be configured to simultaneously store both inventory items 32 and containers 42 and a particular holder may, at a particular point in time, represent both an inventory holder 30 and a container holder 40.

It should also be noted that the various components of inventory system 10 complete various operations involving inventory items 32 and/or the components of inventory system 10 themselves. Management module 15 manages the operation of components and the use of various system resources to facilitate the fulfillment of these tasks. Although the description above focuses on various embodiments of inventory system 10 capable of performing specific operations, a particular embodiment of inventory system 10 may be configured to perform any appropriate operations associated with the storage, processing, transport, or removal of inventory items 32.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A system for transporting refrigerated inventory comprising:
    a refrigerated inventory holder comprising:
        an electric refrigeration unit;
        a plurality of legs; and
        one or more shelves configured to store one or more inventory items; and
        wherein at least one of the plurality of legs includes an electrical contact configured route power from an electrical source contact disposed on a surface of a workspace to the electric refrigeration unit;
    a mobile drive unit operable to:
        move beneath the refrigerated inventory holder via one of a plurality of openings formed by the plurality of legs of the refrigerated inventory holder;
        lift the refrigerated inventory holder by raising a docking head against a lower surface of the refrigerated inventory holder, thereby disconnecting the electrical contact from the electrical source contact; and
        transport the refrigerated inventory holder while lifted.

2. The system of claim 1, wherein the electrical source contact comprises a first electrical source contact and the mobile drive unit is further operable to:
    after transporting the refrigerated inventory holder while lifted, align the electrical contact with a second electrical source contact disposed on the surface of the workspace; and
    lower the refrigerated inventory holder while the electrical contact is in alignment with the second electrical source contact, such that contact is made and power is routed from the second electrical source contact to the electric refrigeration unit.

3. The system of claim 1, wherein the refrigerated inventory holder further comprises a battery backup operable to provide power to the electric refrigeration unit during periods in which the electrical contact does not make contact with an electrical source contact.

4. The system of claim 1, wherein the electrical contact comprises flat, elongated conductive material.

5. The system of claim 1, wherein the electrical contact is disposed on a lower surface of one or more of the plurality of legs.

6. A method comprising:
    identifying, by a management module, an inventory holder having an on-board refrigeration unit operable to electrically couple with a plurality of electrical source contacts disposed on a surface of a workspace; and
    selectively instructing, via a wireless transmission from the management module, a mobile drive unit to dock or undock with the inventory holder, wherein the refrigeration unit of the inventory holder is disconnected from a first electrical source contact while docked with the mobile drive unit and the refrigeration unit of the inventory holder is connected to a second electrical source contact while undocked from the mobile drive unit.

7. The method of claim 6, further comprising:
    transmitting, by the management module, one or more wireless instructions that cause the mobile drive unit to move to the inventory holder, lift the inventory holder, and transport the inventory holder to an inventory station.

8. The method of claim 6, further comprising:
    assigning, by a management module, a priority to the mobile drive unit that is higher than other priorities of other mobile drive units based on a determination that the mobile drive unit transports the inventory holder having the on-board refrigeration unit.

9. The method of claim 6, wherein the inventory holder comprises a plurality of legs and transfers power to the on-board refrigeration unit via at least one electrical contact on one or more legs of the plurality of legs.

10. The method of claim 6, wherein the mobile drive unit comprises a docking head operable to lift the inventory holder and thereby disconnect the inventory holder from the first electrical source contact.

11. The method of claim 6, wherein the mobile drive unit is a self-powered robotic device and comprises a processing unit configured to respond to instructions transmitted wirelessly by the management module.

12. The method of claim 6, wherein the second electrical source contact is proximate to a work station and the mobile drive unit is operable to transport the inventory holder to the work station and connect the refrigeration unit to the second electrical source contact.

13. The apparatus of claim 12, wherein the inventory holder comprises a plurality of legs and the mobile drive unit connects the refrigeration unit to the second electrical source contact by:
- aligning one or more electrical contacts, which are mounted on a surface of one or more of the plurality of legs, to the second electrical source contact; and
- moving such that the one or more electrical contacts make contact with the second electrical source contact.

14. An apparatus, comprising:
- a plurality of legs, one or more of the plurality of legs having one or more electrical contacts configured to receive power via a surface of a workspace;
- a lower docking surface; and
- an on-board electrical device configured to receive power via the one or more electrical contacts;
- wherein the plurality of legs form openings operable to receive a mobile drive unit, the mobile drive unit configured to move beneath the lower docking surface via one of the openings and raise a docking head against the lower docking surface, thereby lifting the plurality of legs off the surface of the workspace and disconnecting power from the on-board electrical device.

15. The apparatus of claim 14, wherein one or more of the plurality of legs include an electrical conduit operable to conduct power received via the surface of the workspace to the on-board electrical device.

16. The apparatus of claim 14, wherein the on-board electrical device is a refrigeration unit and the apparatus further comprises a battery operable to provide power to the refrigeration unit in response to detecting that power received via the surface of the workspace is disconnected.

17. The apparatus of claim 14, wherein the mobile drive unit is operable to raise the docking head in response to instructions received wirelessly from a management module.

18. The apparatus of claim 14, further comprising:
- one or more shelves operable to store one or more inventory items.

19. The apparatus of claim 18, further comprising:
- insulated material configured to facilitate maintenance of a temperature associated with inventory items stored by the one or more shelves.

20. The apparatus of claim 14, wherein the apparatus comprises an inventory holder, and the mobile drive unit is configured to transport a plurality of inventory holders within an automated inventory system.

* * * * *